United States Patent
Sato

(10) Patent No.: US 11,210,557 B2
(45) Date of Patent: Dec. 28, 2021

(54) RECOGNITION APPARATUS, RECOGNITION METHOD, AND RECORDING MEDIUM

(71) Applicant: FUJITSU LIMITED, Kawasaki (JP)

(72) Inventor: Takuya Sato, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 171 days.

(21) Appl. No.: 16/594,251

(22) Filed: Oct. 7, 2019

(65) Prior Publication Data

US 2020/0034659 A1 Jan. 30, 2020

Related U.S. Application Data

(63) Continuation of application No. PCT/JP2017/014716, filed on Apr. 10, 2017.

(51) Int. Cl.
*G06K 9/62* (2006.01)
*G06F 16/583* (2019.01)
*G06K 9/00* (2006.01)

(52) U.S. Cl.
CPC ....... *G06K 9/6255* (2013.01); *G06F 16/5854* (2019.01); *G06K 9/00342* (2013.01); *G06K 9/6257* (2013.01)

(58) Field of Classification Search
None
See application file for complete search history.

(56) References Cited

U.S. PATENT DOCUMENTS

| 8,553,939 B2 | 10/2013 | Craig et al. |
| 8,565,485 B2 | 10/2013 | Craig et al. |
| 8,860,663 B2 | 10/2014 | Craig et al. |

(Continued)

FOREIGN PATENT DOCUMENTS

| JP | 2008-112211 | 5/2008 |
| JP | 2011-181021 | 9/2011 |

(Continued)

OTHER PUBLICATIONS

Extended European Search Report dated Sep. 29, 2020 for corresponding European Patent Application No. 17905268.3, 11 pages.

(Continued)

*Primary Examiner* — David Perlman
(74) *Attorney, Agent, or Firm* — Fujitsu Patent Center

(57) ABSTRACT

A recognition apparatus includes: a memory configured to store a scene recognition dictionary relating a feature of a person included in distance information indicating a distance to the person with a scene identified by a formed angle between a plurality of reference axes perpendicular to each other and a vector based on a skeleton of the person and a skeleton recognition dictionary relating distance information corresponding to the scene with a joint position of the person; and a processor coupled to the memory and configured to: in a case where recognition distance information, which is distance information on an object person, is acquired, recognize a scene corresponding to the recognition distance information based on a feature of the recognition distance information and the scene recognition dictionary, and recognize a skeleton of the object person based on a recognition result of the scene recognized, the recognition distance information, and the skeleton recognition dictionary.

7 Claims, 22 Drawing Sheets

(56) References Cited

U.S. PATENT DOCUMENTS

| | | |
|---|---|---|
| 2008/0152218 A1 | 6/2008 | Okada |
| 2010/0197390 A1 | 8/2010 | Craig et al. |
| 2013/0084982 A1 | 4/2013 | Suzuki |
| 2013/0230211 A1 | 9/2013 | Tanabiki et al. |
| 2013/0241833 A1 | 9/2013 | Craig et al. |
| 2015/0036879 A1 | 2/2015 | Shiozaki et al. |
| 2015/0145860 A1 | 5/2015 | Craig et al. |
| 2018/0068461 A1 | 3/2018 | Shiozaki et al. |

FOREIGN PATENT DOCUMENTS

| | | |
|---|---|---|
| JP | 2011-248525 | 12/2011 |
| JP | 2012-083955 | 4/2012 |
| JP | 2015-097565 | 5/2015 |
| JP | 2015-167008 | 9/2015 |
| WO | 2011/158599 A1 | 12/2011 |
| WO | 2012/046392 A1 | 4/2012 |

OTHER PUBLICATIONS

Azrour, S. et al.,"Leveraging Orientation Knowledge to Enhance Human Pose Estimation Methods", Jul. 2, 2016, Big Data Analytics in the Social and Ubiquitous Context : 5th International Workshop on Modeling Social Media, MSM 2014, 5th International Workshop on Mining Ubiquitous and Social Environments, Muse 2014 and First International Workshop on Machine LE, pp. 81-87, XP047350331.

Sun, Min et al.,"Conditional Regression Forests for Human Pose Estimation", IEEE Computer Society Conference on Computer Vision and Pattern Recognition. Proceed2017 IEEE Conference on Computer Vision and Pattern Recognitionings, Jan. 1, 2012, pp. 3394-3401, XP055237686.

Choi, Jinyoung et al.,"Human Body Orientation Estimation using Convolutional Neural Network", Sep. 7, 2016, 5 pages, XP055730860.

Jamie Shotton, et al., "Real-Time Human Pose Recognition in Parts from Single Depth Image", CVPR, pp. 1297-1304, 2011.

Matthias Dantone, et al., "Real-Time Facial Feature Detection using Conditional Regression Forests", CVPR, pp. 2578-2585, 2012.

Yoshiki Agata, et al., "Recognition of Human Body Parts with Conditional Classification Forests", Dynamic Image processing for real Application workshop 2013 (Mar. 7-8, 2013) pp. 7-12.

ISR—International Search Report (Form PCT/ISA/210 and PCT/ISA/237) dated Jun. 20, 2017 for International Application No. PCT/JP2017/014716.

FIG.14
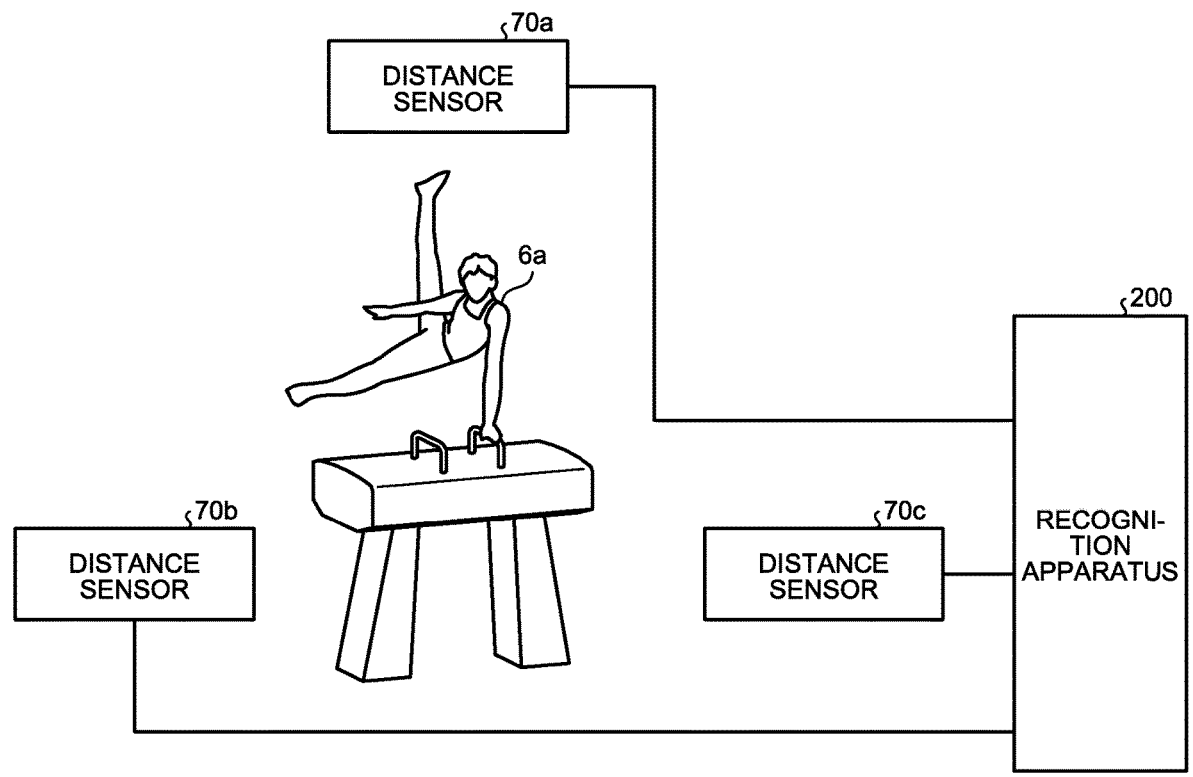
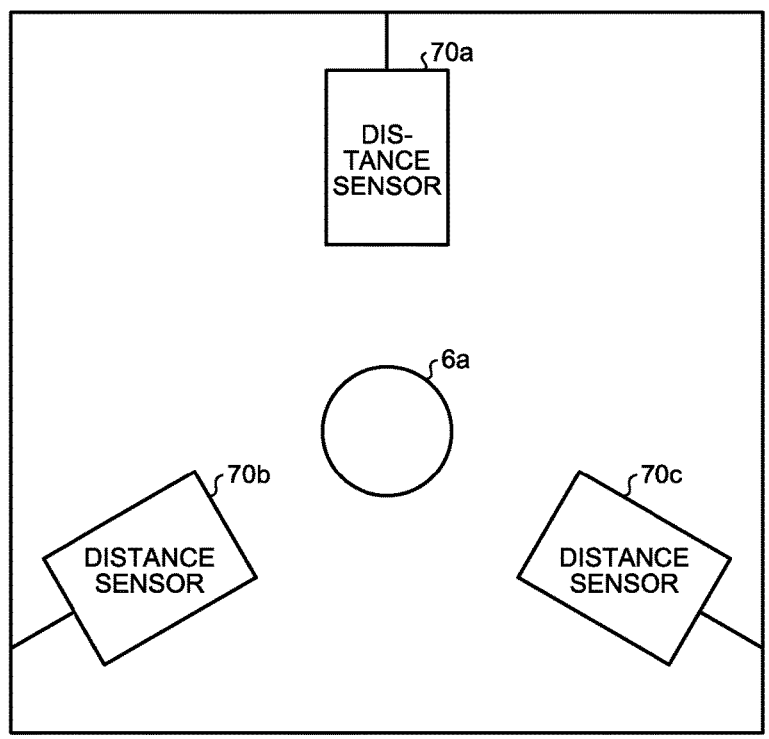

RECOGNITION APPARATUS, RECOGNITION METHOD, AND RECORDING MEDIUM

CROSS-REFERENCE TO RELATED APPLICATION

This application is a continuation application of International Application PCT/JP2017/014716, filed on Apr. 10, 2017 and designating the U.S., the entire contents of which are incorporated herein by reference.

FIELD

The present invention relates to a recognition apparatus and the like.

BACKGROUND

Nowadays, there is a technology that generates a dictionary through machine learning based on distance data (distance image) or an RGB (Red Green Blue) image, which is a result of sensing by a distance sensor, and uses the generated dictionary to recognize the skeleton of a human body.

FIG. 20 is a diagram that illustrates an example of a related skeleton recognition system. In the example illustrated in FIG. 20, sensing is conducted by using a distance sensor 5a to acquire distance data 5b including an object person 6a, and the distance data 5b and a dictionary 5c are used to estimate a three-dimensional skeleton position 6b of the object person 6a. The dictionary 5c is previously subjected to machine learning.

Furthermore, there is a disclosed technology, as disclosed in a related art 1, in which a pixel corresponding to a human body is extracted from the image data and each part of the extracted pixel is labeled as a human body site so that the skeleton model of the human body is estimated.

Here, to recognize the skeleton of a human body, it is assumed that learning is conducted for every action, which is the recognition target during learning, and therefore, for example, if a single dictionary is used to recognize a wide range of complicated actions, such as gymnastics, the recognition accuracy is decreased.

A related art 2 prevents a decrease in the recognition accuracy. The related art 2 is a technology regarding the recognition of a feature point on a face. A feature point of the face is a point indicating the position of an eye, nose, mouth, or the like. According to the related art 2, learning data is divided in accordance with a direction, such as the front, the right, or the left, and the face feature point is learned in each set of divided learning data. With reference to FIG. 21 and FIG. 22, an example of the related art 2 is described below.

FIG. 21 is a diagram that illustrates an example of learning of a face feature point according to the related art 2. For the learning of a feature point according to the related art 2, the image previously classified in accordance with the direction of the face and the training data indicating the face feature point in the image are used so that machine learning is executed independently with regard to each direction. Thus, the feature point is recognized while the direction of the input face image is restricted.

In the example illustrated in FIG. 21, the feature point in a leftward face image is learned by using training data 1a of a left-facing learning image and a face feature point to obtain a left-facing identifying device 2a. The feature point of a frontward face image is learned by using training data 1b of a front-facing learning image and a face feature point to obtain a front-facing identifying device 2b. The feature point of a rightward face image is learned by using training data 1c of a right-facing learning image and a face feature point to obtain a right-facing identifying device 2c.

FIG. 22 is a diagram that illustrates a recognition process for a feature point according to the related art 2. As illustrated in FIG. 22, according to the related art 2, after a face image 3a is received, the direction of the face image 3a is recognized based on a face-direction identifying device 4. According to the related art 2, any identifying device is selected from the identifying devices 2a to 2c based on a recognition result of the direction and, by using the selected identifying device, the feature point of the face image 3a is recognized so that a recognition result 3b is obtained. Thus, according to the related art 2, the identifying devices are selectively used in accordance with the direction of the face image, whereby the recognition accuracy of the feature point may be improved.

Patent Document 1: U.S. Patent No. 2010/0197390
Patent Document 2: U.S. Patent No. 2013/0241833
Non Patent Document 1: J. Shotton, A. Pitzgibbon, M. Cook, T. Sharp, M. Finocchio, R. Moore, A. Kipman, A. Blake, "Real-time human pose recognition in parts from a single depth image," CVPR, pp. 1297-1304, 2011.
Non Patent Document 2: M. Dantone, J. Gall, G. Fanelli, and L. Van Gool, "Real-time facial feature detection using conditional regression forests," CVPR, pp. 2578-2585, 2012.

SUMMARY

According to an aspect of the embodiments, a recognition apparatus includes: a memory configured to store a scene recognition dictionary relating a feature of a person included in distance information indicating a distance to the person with a scene identified by a formed angle between a plurality of reference axes perpendicular to each other and a vector based on a skeleton of the person and a skeleton recognition dictionary relating distance information corresponding to the scene with a joint position of the person; and a processor coupled to the memory and configured to: in a case where recognition distance information, which is distance information on an object person, is acquired, recognize a scene corresponding to the recognition distance information based on a feature of the recognition distance information and the scene recognition dictionary, and recognize a skeleton of the object person based on a recognition result of the scene recognized, the recognition distance information, and the skeleton recognition dictionary.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram that illustrates a configuration of a system according to a second embodiment;

DESCRIPTION OF EMBODIMENTS

However, the above-described related arts have a problem of low accuracy of the skeleton recognition on a human body.

For example, although the direction of the face image 3a is recognized by using the face-direction identifying device 4 according to the related art 2, scene identification in the same manner as for a face image is difficult with regard to the object that makes a complicated movement as described in the related art 1. The difficulty in accurately identifying a scene causes the difficulty in using the optimum dictionary and, as a result, causes degradation in the recognition accuracy.

Embodiments provide an apparatus that makes it possible to improve the accuracy of recognition of the skeleton of a human body.

With reference to the drawings, embodiments of a recognition apparatus, a recognition method, and a recognition program according to the present invention are described below in detail. Furthermore, the present invention is not limited to the embodiments.

First Embodiment

Figure 1A:
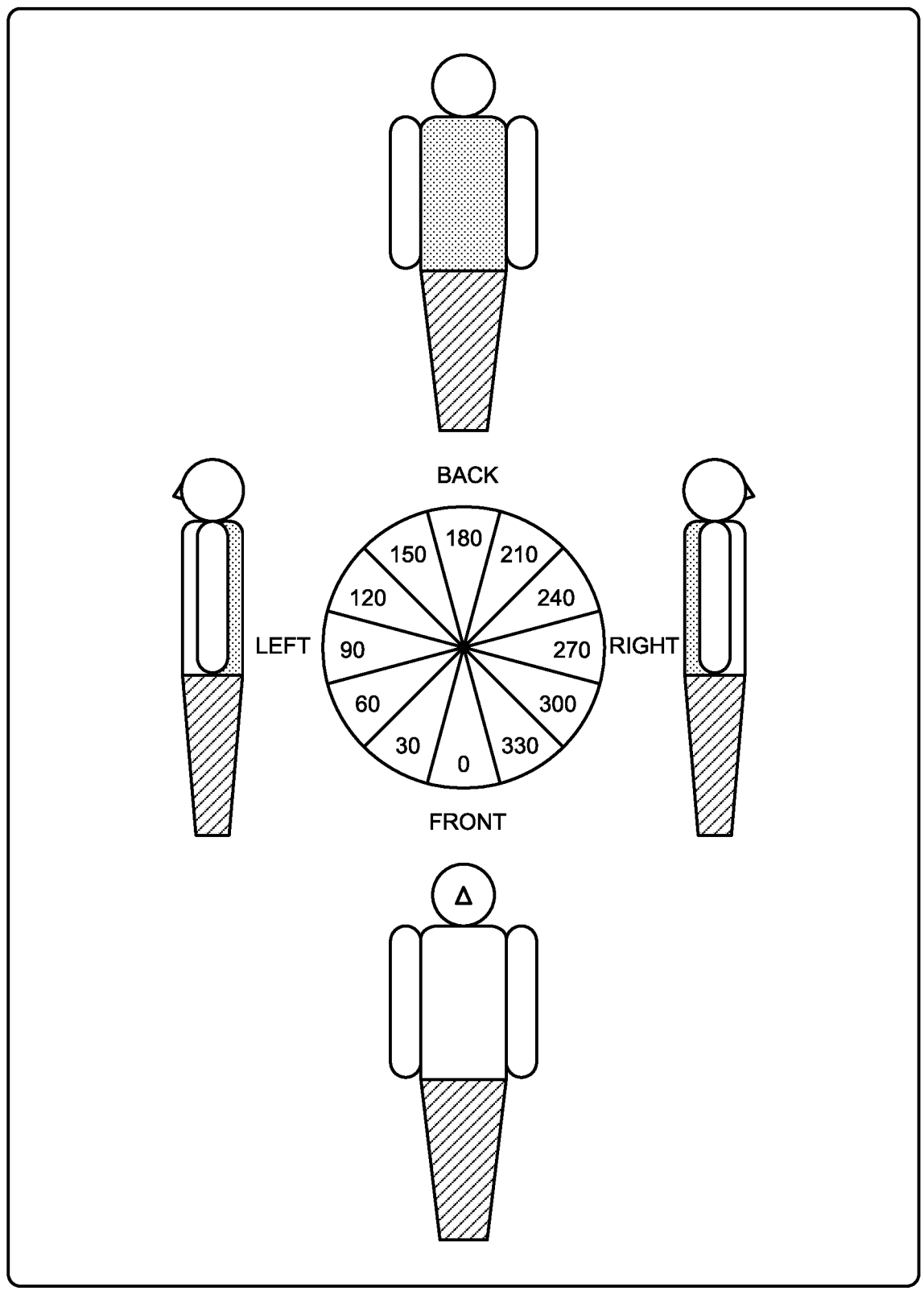
FIG. 1A is a diagram that illustrates an example of definition of a direction of a person used in a first embodiment.

FIG. 1A is a diagram that illustrates an example of the definition of the direction of a person used in a first embodiment. As illustrated in FIG. 1A, the case where a person faces the front with a straight line vertical to the ground as an axis is 0° as a representative. The case where a person faces the left is 90°. The case where a person faces the back is 180°. The case where a person faces the right is 270°. According to the first embodiment, the direction is recognized in a unit that is each of four divisions by 90° to conduct skeleton recognition. For example, the front is 315° to 45°, the left is 45° to 135°, the back is 135° to 225°, and the right is 2250 to 3150.

Figure 1B:
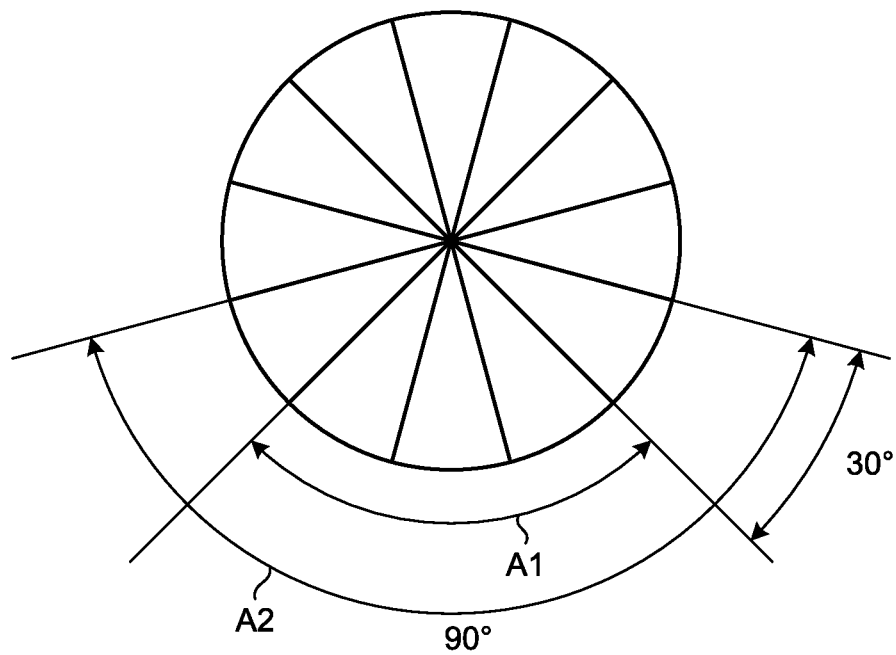
FIG. 1B is a diagram (1) that illustrates an example of a recognition unit of a direction, a recognition range, and a learning range used in the first embodiment.
Figure 1C:
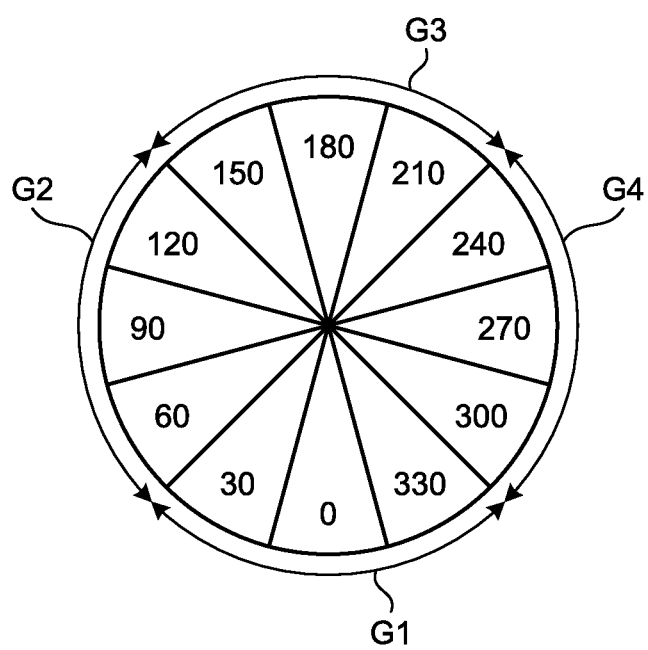
FIG. 1C is a diagram (2) that illustrates an example of the recognition unit of a direction, the recognition range, and the learning range used in the first embodiment.

FIG. 1B and FIG. 1C are diagrams that illustrate an example of a recognition unit of a direction, a recognition range, and a learning range used in the first embodiment. For example, the recognition apparatus uses a narrow range to recognize the direction of a person and, to estimate a joint position, uses a result of learning with a wide range that is the combination of a plurality of recognition units. FIG. 1C illustrates an example of the recognition unit for the direction recognition. At the time of direction recognition, the recognition apparatus executes learning and recognition by 30°, groups the results by 90°, and finally determines any of a group G1 on the front, a group G2 on the left, a group G3 on the back, and a group G4 on the right.

As illustrated in FIG. 1B, the recognition apparatus determines the direction by a recognition range A1 as a unit. For example, the unit of the recognition range A1 corresponds to the unit (a unit by 90°) of each of the groups G1 to G4 described in FIG. 1C. Furthermore, in a case where the actual direction of a person during recognition is near the boundary between four divisions, the recognition apparatus executes learning by using data in a learning range A2 to prevent a decrease in the accuracy of skeleton recognition. For example, the learning range A2 is a range of 150° that is extended to the right by 30° and to the left by 30° as compared with the recognition range A1.

Figure 1D:
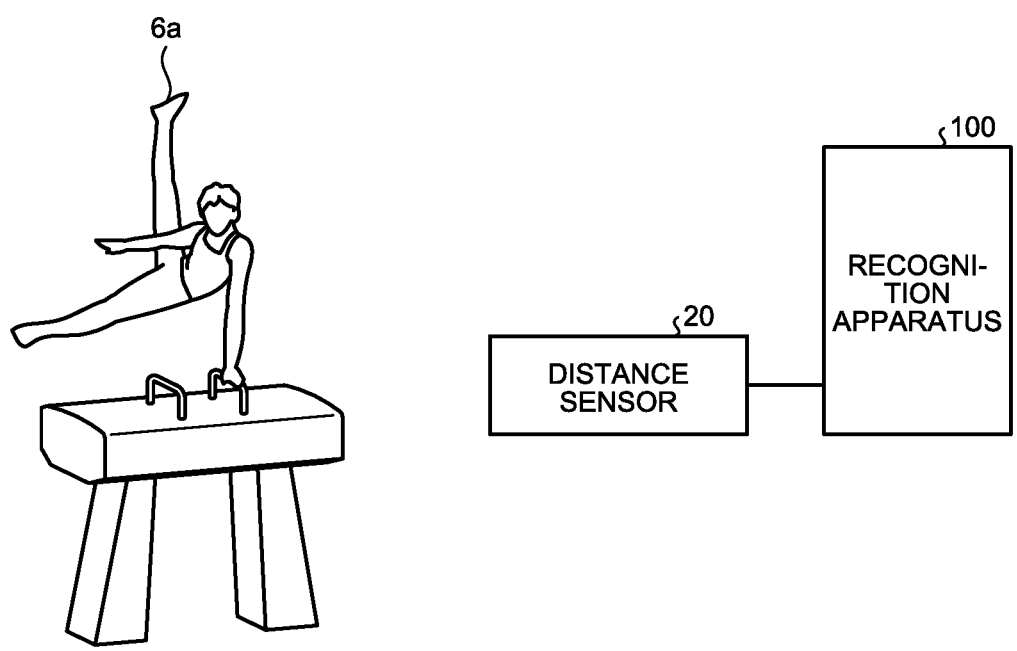
FIG. 1D is a diagram that illustrates a configuration of a system according to the first embodiment.

FIG. 1D is a diagram that illustrates a configuration of a system according to the first embodiment. As illustrated in FIG. 1D, the system includes a distance sensor 20 and a recognition apparatus 100. The recognition apparatus 100 is coupled to the distance sensor 20. The recognition apparatus 100 stores therein a scene recognition dictionary and a skeleton recognition dictionary that are previously trained. The recognition apparatus 100 uses the scene recognition dictionary and the skeleton recognition dictionary to conduct skeleton recognition on the object person 6a. Although an explanation is given in the first embodiment of a case where, for example, the recognition apparatus 100 trains the scene recognition dictionary and the skeleton recognition dictionary, an external computer other than the recognition apparatus 100 may train the scene recognition dictionary and the skeleton recognition dictionary, and the recognition apparatus 100 may store therein the scene recognition dictionary and the skeleton recognition dictionary.

The distance sensor 20 is a sensor that measures the distance information from the installation position of the distance sensor 20 to each observation point on the object person 6a included in the capturing range of the distance sensor 20. The distance sensor 20 generates the distance data representing the three-dimensional coordinates of each observation point and outputs the generated distance data to the recognition apparatus 100. In the following description, the distance data output to the recognition apparatus 100 by the distance sensor 20 is described as "recognition data".

The recognition apparatus 100 acquires the recognition data from the distance sensor 20 and recognizes the skeleton position of the object person 6a based on a scene recognition dictionary 130a and a skeleton recognition dictionary 130b.

Figure 2:
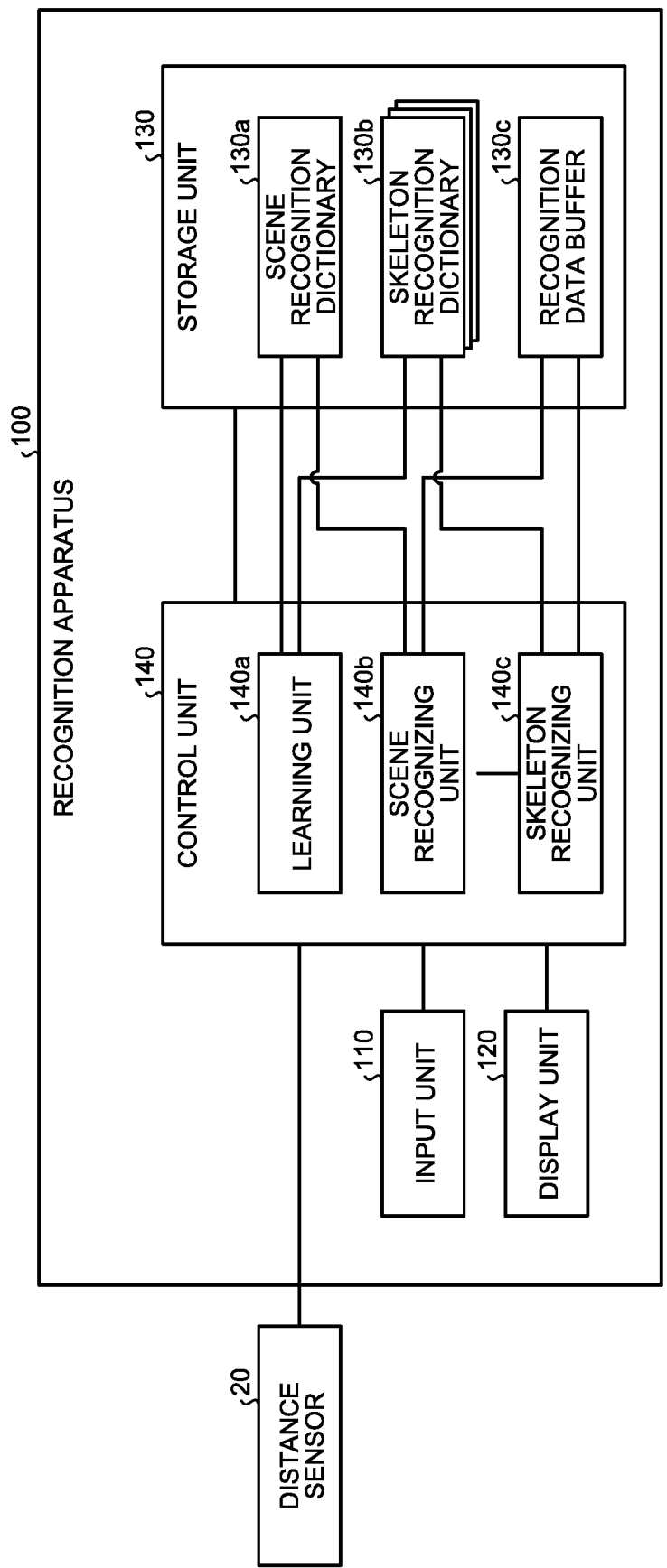
FIG. 2 is a functional block diagram that illustrates a configuration of a recognition apparatus according to the first embodiment.

FIG. 2 is a functional block diagram that illustrates a configuration of the recognition apparatus according to the first embodiment. As illustrated in FIG. 2, the recognition apparatus 100 includes an input unit 110, a display unit 120, a storage unit 130, and a control unit 140. Furthermore, the recognition apparatus 100 is coupled to the distance sensor 20.

The input unit 110 is an input device for inputting various types of information to the recognition apparatus 100. The input unit 110 corresponds to, for example, a keyboard, a mouse, or a touch panel.

The display unit 120 is a display device that displays information output from the control unit 140. The display unit 120 corresponds to, for example, a liquid crystal display or a touch panel.

The storage unit 130 includes the scene recognition dictionary 130a, the skeleton recognition dictionary 130b, and a recognition data buffer 130c. The storage unit 130 corresponds to a storage device, e.g., a semiconductor memory device, such as a RAM (Random Access Memory), a ROM (Read Only Memory), or a flash memory (Flash Memory), or an HDD (Hard Disk Drive).

The scene recognition dictionary 130a is dictionary information used for determining which scene the image data included in recognition data corresponds to. For example, the scene recognition dictionary 130a relates the scene identification information for uniquely identifying a scene with the feature of the distance data corresponding to the scene identification information.

The skeleton recognition dictionary 130b is dictionary information representing the hypothetical joint position (skeleton position) in each scene. For example, the skeleton recognition dictionary 130b relates scene identification information, the distance data corresponding to the scene identification information, and information (skeleton dictionary information) on the joint position of a person. Although not illustrated, it is assumed that there is skeleton dictionary information corresponding to each set of scene identification information.

The recognition data buffer 130c is a buffer that stores recognition data. The recognition data corresponds to the distance data output from the distance sensor 20.

A reference is made back to FIG. 2. The control unit 140 includes a learning unit 140a, a scene recognizing unit 140b, and a skeleton recognizing unit 140c. The control unit 140 is implemented by a CPU (Central Processing Unit), an MPU (Micro Processing Unit), or the like. Further, the control unit 140 may be also implemented by a hard wired logic, such as an ASIC (Application Specific Integrated Circuit) or an FPGA (Field Programmable Gate Array).

The learning unit 140a is a processing unit that generates the scene recognition dictionary 130a and the skeleton recognition dictionary 130b.

Figure 3:
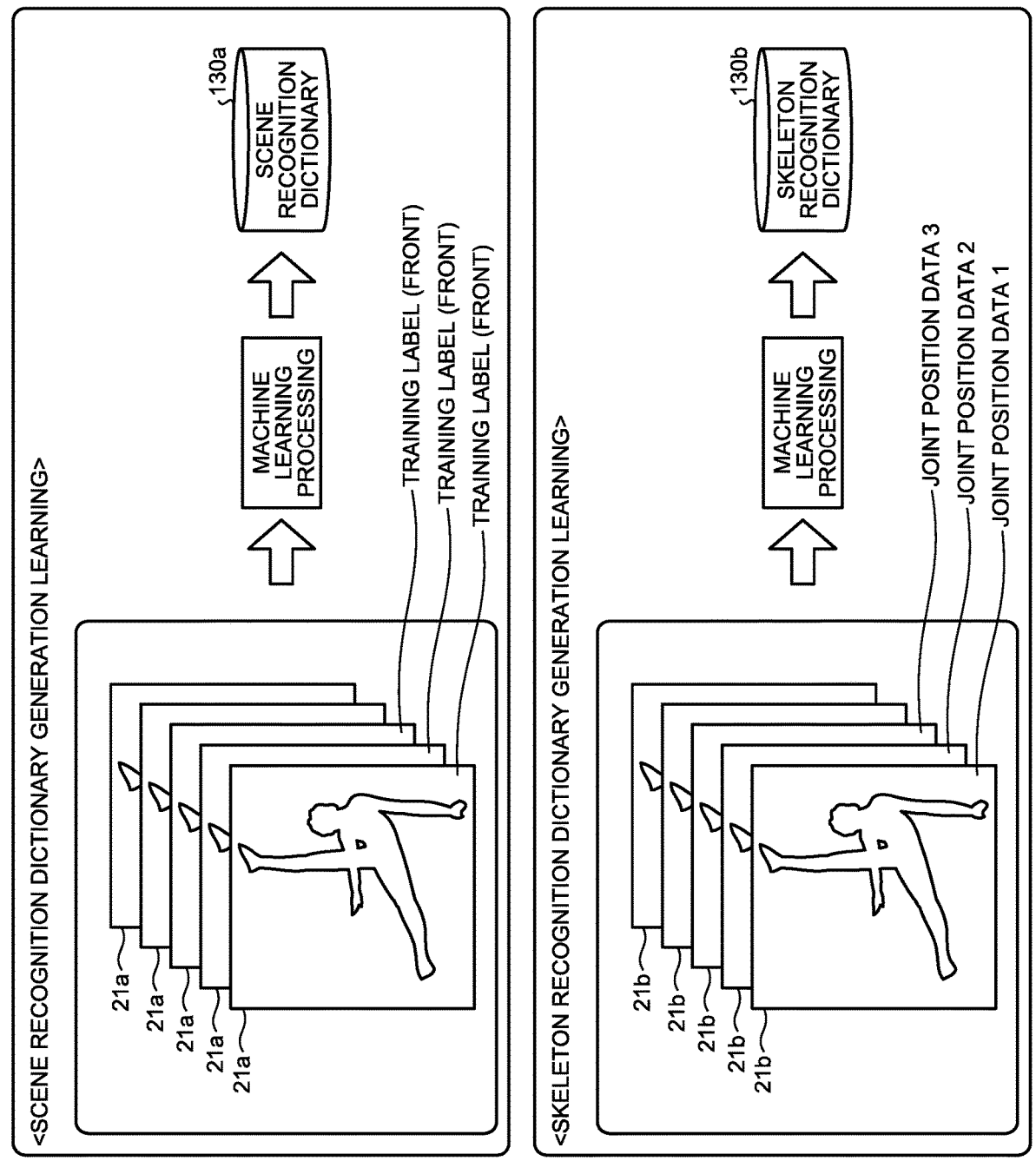
FIG. 3 is a diagram that illustrates an example of a learning process.

FIG. 3 is a diagram that illustrates an example of a learning process. The upper section illustrates an example of the process to generate the scene recognition dictionary 130a through learning. The learning unit 140a executes learning by using the distance image data generated by CG, or the like, and the accompanying scene-recognition training label data by the set. The training label is the information for uniquely identifying the direction of a person included in each set of distance data 21a, and it is any one of the directions of the person, "front", "left", "back", and "right". Furthermore, the training label may be information (classification) directly indicating the person direction range as in FIG. 1B or may be the angle value (regression) itself indicating the direction of the person included in the distance data 21a. Moreover, as described later, the learning unit 140a may determine the scene identification information on the basis of the angle formed between the reference axis and the axis based on the skeleton of the person in accordance with the joint position data on the person. The scene identification information serves as a training label. The joint position data on a person may be acquired by using motion capture, or the like.

For the scene recognition dictionary generation learning, the learning unit 140a executes machine learning based on the plurality of sets of distance data 21a, to which the scene-recognition training label "front" is assigned, and extracts the feature of the person direction "front". The person direction "front" and the feature of the person direction "front" are related to each other and are registered in a scene recognition dictionary 130a. The learning unit 140a executes machine learning in the same manner with regard to a plurality of sets of distance data to which other training labels "left", "back", and "right" are assigned. The features of the person directions "left", "back", and "right" are related to the person directions "left", "back", and "right", respectively, and are registered in the scene recognition dictionary 130a.

To generate the skeleton recognition dictionary 130b, the learning unit 140a executes machine learning by using, as training data, the input of a site label image or a distance image 21b associated with a skeleton position. Furthermore, the learning unit 140a may determine the angle between the reference axis and the axis based on the skeleton of the person on the basis of the joint position data on the person and determine each set of scene identification information, as described later.

Figure 4:
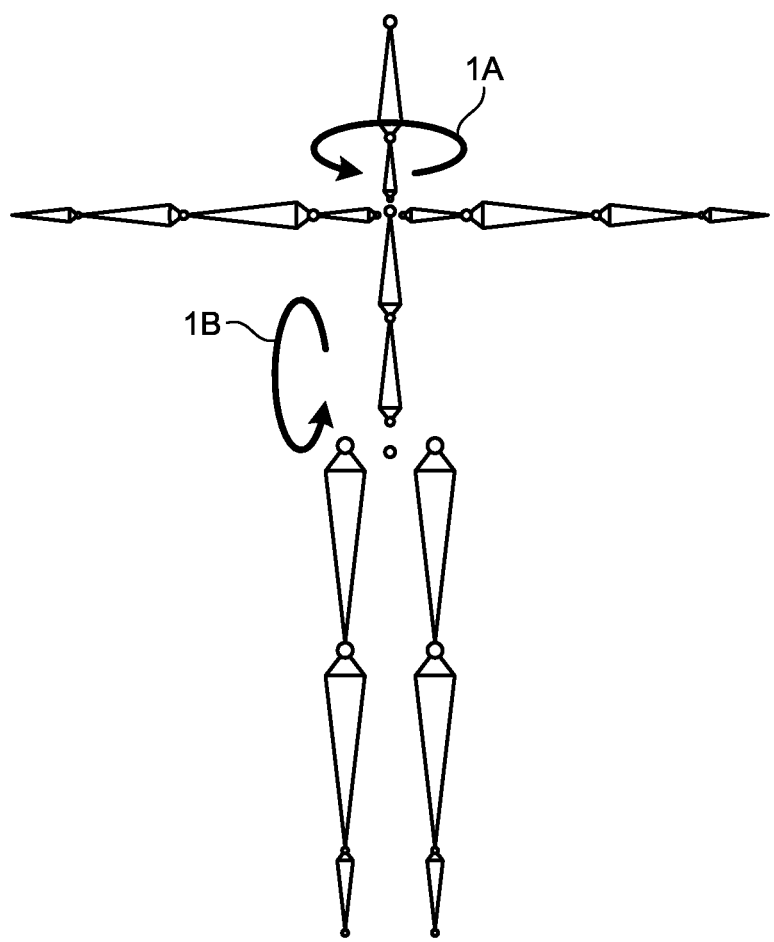
FIG. 4 is a diagram that illustrates a spin direction and a forward direction.

FIG. 4 is a diagram that illustrates a spin direction and a forward direction. As illustrated in FIG. 4, the spin direction is a direction 1A. The forward direction is a direction 1B. This figure illustrates an example of the scene classification that is based on the angle between two axes on the basis of the skeleton of the person; however, a division may be made by three axes including the axis perpendicular to the two.

Figure 5:
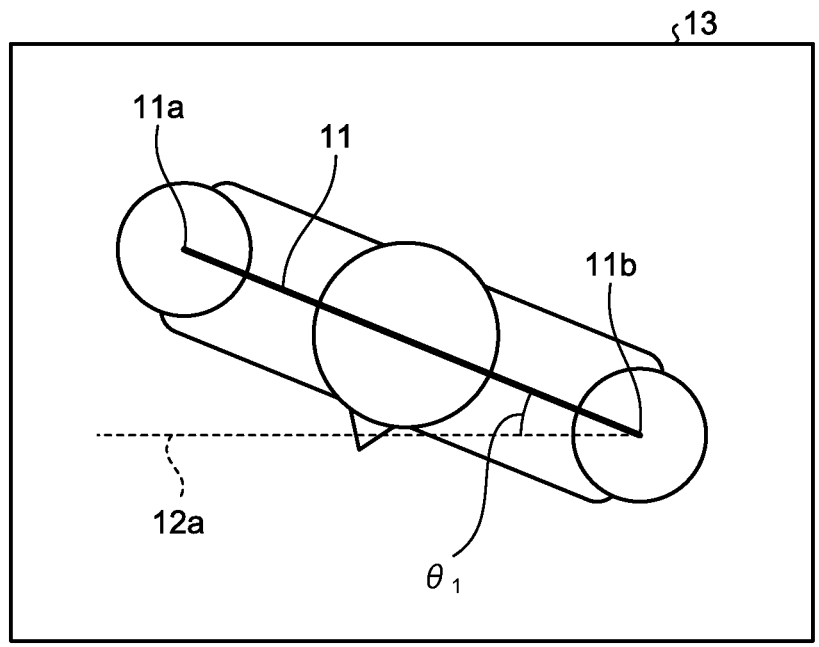
FIG. 5 is a diagram that illustrates a formed angle in the spin direction.

FIG. 5 is a diagram that illustrates the formed angle in the spin direction. The formed angle in the spin direction corresponds to a formed angle $\theta_1$ between a line segment 11 and a reference line 12a. For example, the line segment 11 is a line segment that is obtained by projecting, onto a plane 13, the straight line connecting a right shoulder 11a and a left shoulder 11b of the person. The plane 13 may be a plane parallel to the floor. The positions of the right shoulder 11a and the left shoulder 11b of the person are identified by the joint position data on the person. The reference line 12a may be a line segment horizontal to the X-axis direction of the plane 13 or may be a line segment obtained by projecting, onto the plane 13, the straight line connecting the right shoulder 11a and the left shoulder 11b of the person at the start timing.

Figure 6:
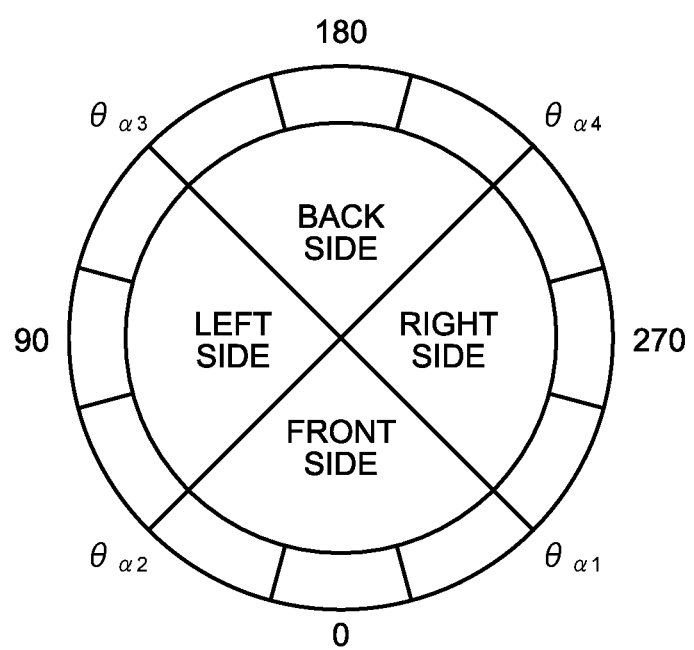
FIG. 6 is a diagram that illustrates an example of a classification basis for an attitude in the spin direction.

Next, an explanation is given of an example of the process by the learning unit 140a to determine scene identification information based on the joint position data on the person during learning image classification (in a case where distance data is classified in accordance with a scene). During the learning image classification by the learning unit 140a, the attitude of the person in the spin direction is classified into any of "front side", "left side", "back side", and "right side" in accordance with the formed angle $\theta_1$. FIG. 6 is a diagram that illustrates an example of the classification basis for the attitude in the spin direction. For example, when the formed angle $\theta_1$ is included in the range of from $\theta_{\alpha 1}$ to $\theta_{\alpha 2}$, it is determined that the attitude in the spin direction is "front side". When the formed angle $\theta_1$ is included in the range of from $\theta_{\alpha 2}$ to $\theta\theta_{\alpha 3}$, it is determined that the attitude in the spin direction is "left side". When the formed angle $\theta_1$ is included in the range of from $\theta_{\alpha 3}$ to $\theta_{\alpha 4}$, it is determined that the attitude in the spin direction is "back side". When the formed angle $\theta_1$ is included in the range of from $\theta_{\alpha 4}$ to $\theta_{\alpha 1}$, it is determined that the attitude in the spin direction is "right side".

Figure 7:
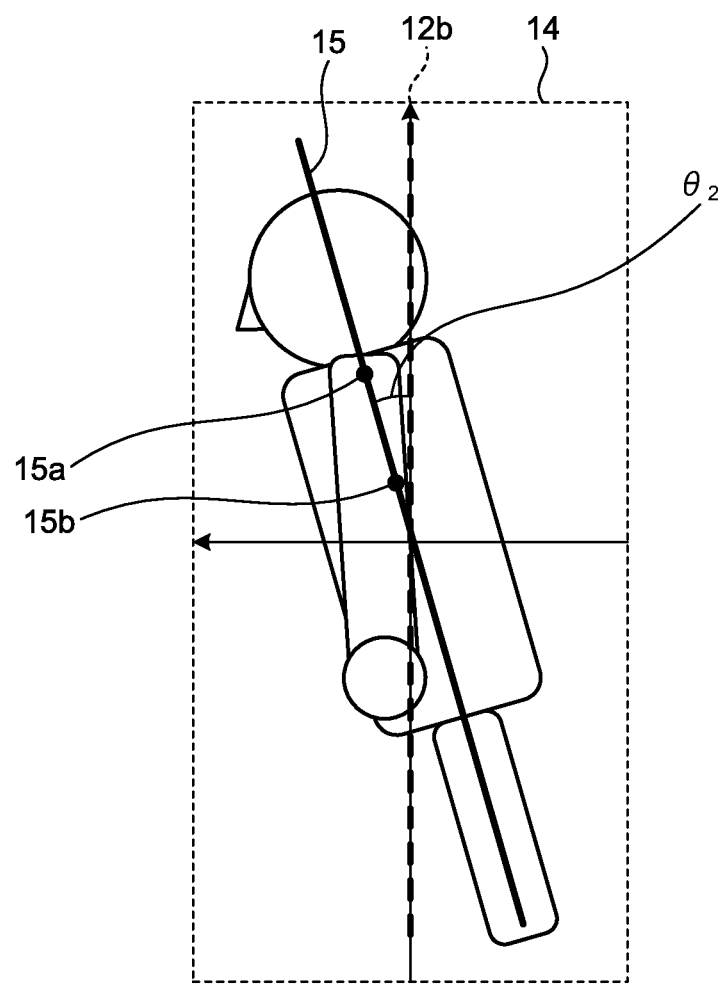
FIG. 7 is a diagram that illustrates a formed angle in the forward direction.

FIG. 7 is a diagram that illustrates the formed angle in the forward direction. The formed angle in the forward direction is a formed angle $\theta_2$ between a line segment 15 and a reference line 12b. For example, the line segment 15 is a line segment that is obtained by projecting, onto a plane 14, the straight line passing through 15a, 15b on the backbone. The positions of 15a, 15b on the backbone are identified by the joint position data on the person. The reference line 12b is a line segment obtained by projecting, onto the plane 14, the line segment upward in the vertical direction.

Figure 8:
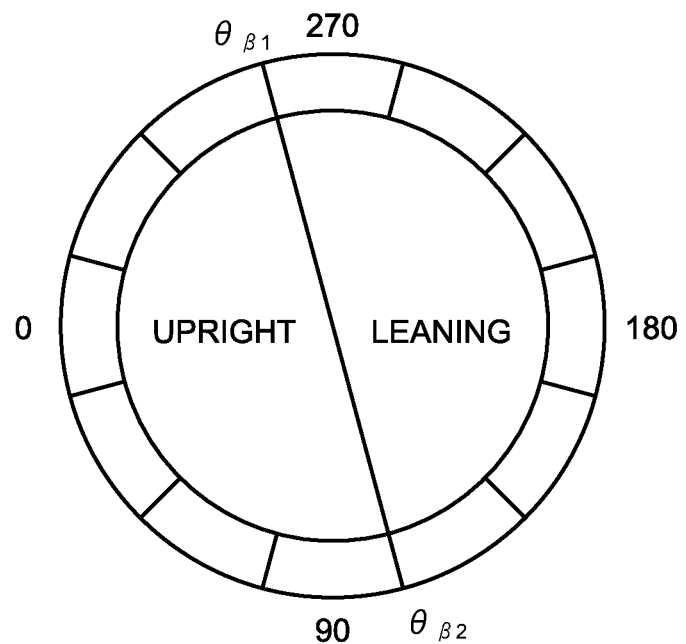
FIG. 8 is a diagram that illustrates an example of a classification basis for an attitude in the forward direction.

During the learning image classification by the learning unit 140a, the attitude of the person in the forward direction is classified into any of "upright" and "leaning" in accordance with the formed angle $\theta_2$. FIG. 8 is a diagram that illustrates an example of the classification basis for the attitude in the forward direction. For example, when the formed angle $\theta_2$ is included in the range of from $\theta_{\beta 1}$ (285°) to $\theta_{\beta 2}$ (105°), it is determined that the attitude in the forward direction is "upright". When the formed angle $\theta_2$ is included in the range of from $\theta_{\beta 2}$ (105°) to $\theta_{\beta 1}$ (285°), it is determined that the attitude in the forward direction is "leaning".

During the generation of the scene recognition dictionary 130a by the learning unit 140a, the attitude in the spin direction corresponding to the formed angle $\theta_1$ and the attitude in the forward direction corresponding to the formed angle $\theta_2$ are determined based on the joint position data, and the corresponding scene identification information is identified based on the combination of the attitude in the spin direction and the attitude in the forward direction.

For example, in a case where the attitude in the forward direction is "upright" and the attitude in the spin direction is "front side", the learning unit 140a determines that it is a "first scene". In a case where the attitude in the forward direction is "upright" and the attitude in the spin direction is "left side", the learning unit 140a determines that it is a "second scene". In a case where the attitude in the forward direction is "upright" and the attitude in the spin direction is "back side", the learning unit 140a determines that it is a "third scene". In a case where the attitude in the forward direction is "upright" and the attitude in the spin direction is "right side", the learning unit 140a determines that it is a "fourth scene".

For example, in a case where the attitude in the forward direction is "leaning" and the attitude in the spin direction is "front side", the learning unit 140a determines that it is a "fifth scene". In a case where the attitude in the forward direction is "leaning" and the attitude in the spin direction is "left side", the learning unit 140a determines that it is a "sixth scene". In a case where the attitude in the forward direction is "leaning" and the attitude in the spin direction is "back side", the learning unit 140a determines that it is a "seventh scene". In a case where the attitude in the forward direction is "leaning" and the attitude in the spin direction is "right side", the learning unit 140a determines that it is an "eighth scene".

Figure 9:
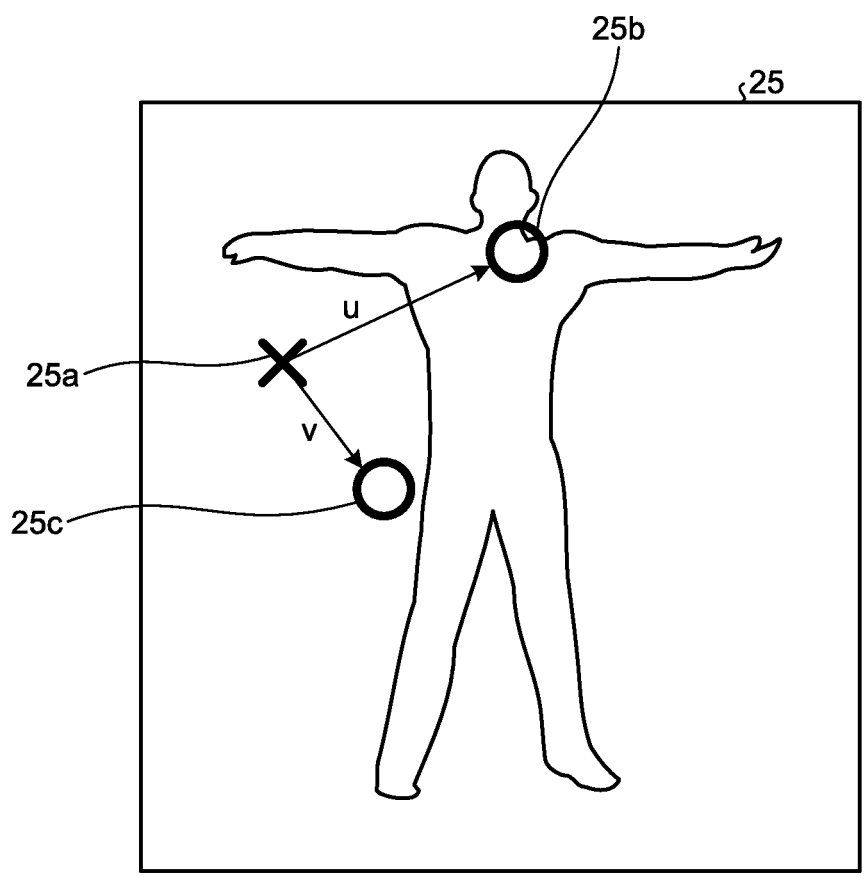
FIG. 9 is a diagram that illustrates a process to extract a feature from distance data.

During the generation of the scene recognition dictionary 130a, the learning unit 140a extracts the feature of each set of distance data with regard to each set of scene identification information on the basis of various machine learning techniques. FIG. 9 is a diagram that illustrates a process to extract a feature from distance data. For the convenience of explanation in FIG. 9, a distance image 25 visually illustrating distance data is used. The learning unit 140a sets a plurality of groups of pixel-of-interest coordinates 25a, a vector u, and a vector v in a random manner. With regard to the distance image 25, the learning unit 140a calculates the difference between the distance value indicated by the pixel value of a selected pixel 25b away from the pixel of interest 25a by the vector u and the distance value indicated by the pixel value of a selected pixel 25c away from the pixel of interest 25a by the vector v. The learning unit 140a executes the calculation of a distance difference with regard to the distance image 25 for the number of times corresponding to the number of groups of the pixel of interest 25a, the vector u, and the vector v and then extracts the distance differences as a feature of the distance image 25. The learning unit 140a extracts a feature by using the same group of the pixel of interest 25a, the vector u, and the vector v with regard to each set of distance data (distance image). Based on the feature of each set of distance data and the scene identification information, the learning unit 140a determines the threshold for a feature for properly classifying a scene through machine learning and registers it in the scene recognition dictionary 130a. That is, the first scene to the eighth scene are classified by using the threshold for a feature.

More specifically, the learning unit 140a prepares a plurality of (e.g., approximately a few hundred to a few thousand) parameters, such as a feature-value 1 parameter: pixel-of-interest coordinates a1(x1,y1), a vector u1, and a vector v1, a feature-value 2 parameter: pixel-of-interest coordinates a2(x2,y2), a vector u2, and a vector v2. The learning unit 140a calculates a feature based on the above-described feature parameter with regard to all the learning images (distance data), combines any number (e.g., approximately 10 to 20) of features, finds, through machine learning, the pair of a feature and a threshold with which each scene is properly classified in such a manner that, for example, an image is the first scene if the value of a feature 77 is more than a, the value of a feature 5 is more than b, . . . , and the value of a feature 123 is more than c, an image is the fifth scene if the value of the feature 77 is more than a, the value of the feature 5 is more than b, . . . , and the value of the feature 123 is less than c, and obtains the scene recognition dictionary 130a.

To generate the skeleton recognition dictionary 130b, the learning unit 140a generates a skeleton recognition dictionary for each set of scene identification information based on a distance image, a site label image, or skeleton three-dimensional coordinates. For example, the skeleton recognition dictionary is information relating distance data and information on the joint position of a person.

To generate the skeleton recognition dictionary 130b, the learning unit 140a uses the joint position data for each set of scene identification information to automatically generate a dictionary. The learning unit 140a performs the same process as the above-described process so as to identify the scene identification information based on the joint positions of both shoulders that are previously determined. With regard to the identified scene (e.g., the first scene), the corresponding distance image and site label image or distance image and skeleton three-dimensional coordinates are selected, and the skeleton recognition dictionary 130b for the identified scene is automatically generated. Other scenes "the second scene to the eighth scene, and the like" may be also identified as is the case with the first scene and registered in the skeleton recognition dictionary 130b.

Here, according to the first embodiment, the classification for scenes and the learning range of the skeleton recognition dictionary 130b in the spin direction are in the four directions by 90 degrees; however, this is not a limitation. For example, it is possible that the scene classification is conducted in four directions by 90 degrees, learning is executed in a range that is extended at two ends by 30 degrees in each scene, and a result of the skeleton recognition is obtained as the corresponding skeleton recognition dictionary 130b.

Figure 10:
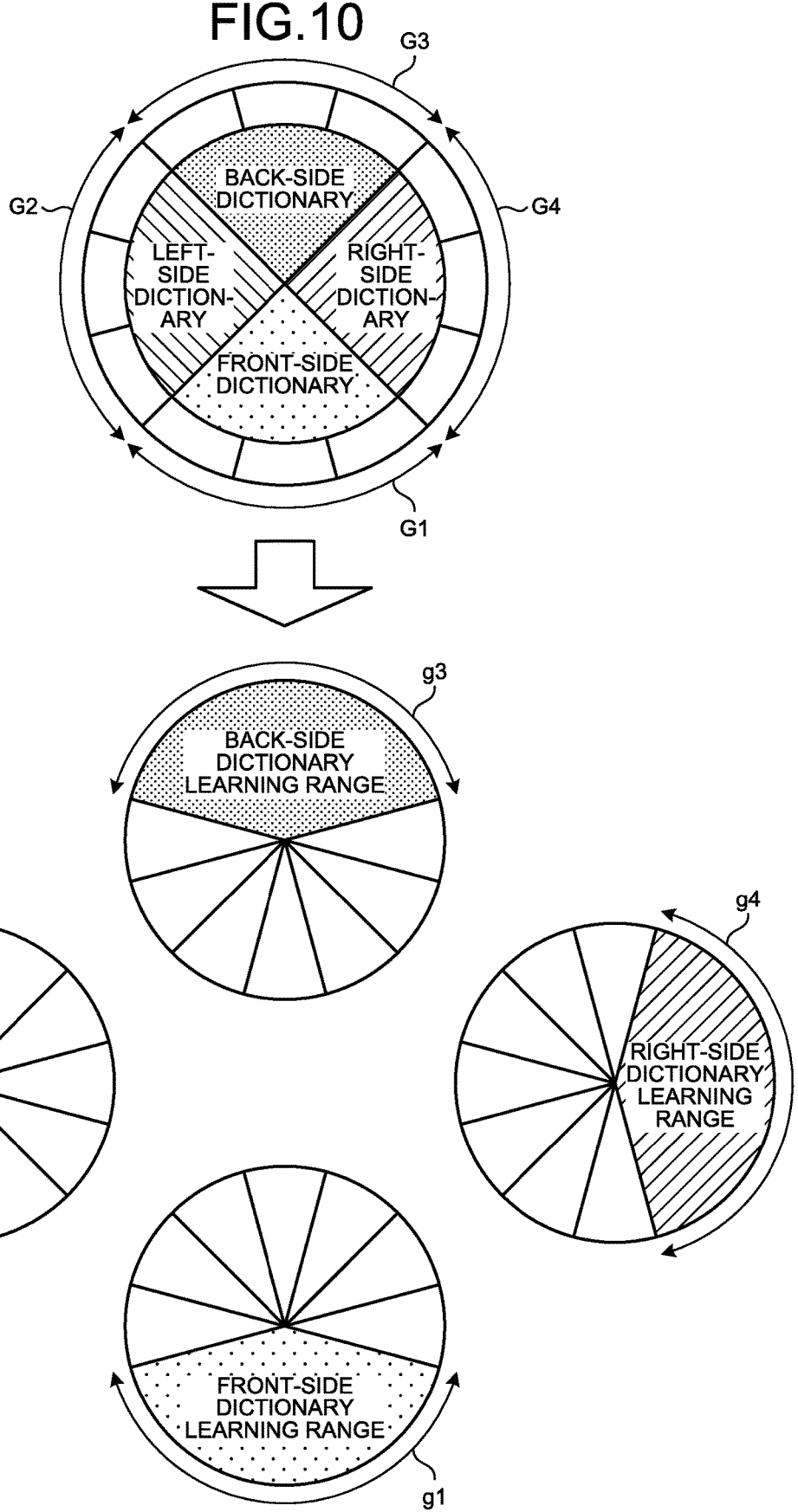
FIG. 10 is a diagram (1) that illustrates an example of a selection range and a learning range of a skeleton recognition dictionary.
Figure 11:
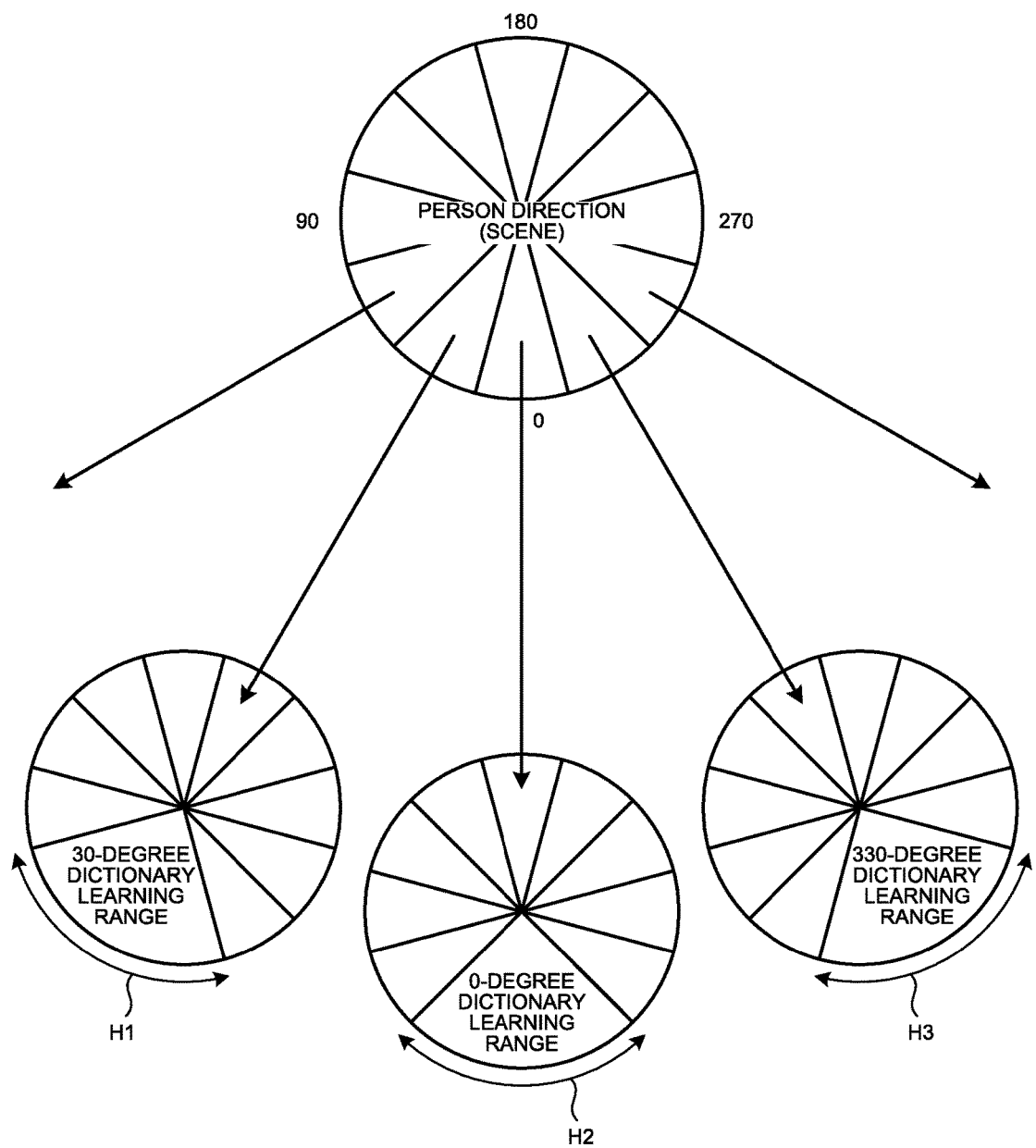
FIG. 11 is a diagram (2) that illustrates an example of the selection range and the learning range of the skeleton recognition dictionary.

FIG. 10 and FIG. 11 are diagrams that illustrate an example of the selection range and the learning range of the skeleton recognition dictionary. As illustrated in FIG. 10, for example, to train a front-side dictionary corresponding to a range G1 in the spin direction, the front-side dictionary is trained in a range g1 that is extended at two ends by 30 degrees as compared with the range G1. To train a left-side dictionary corresponding to a range G2 in the spin direction, the left-side dictionary is trained in a range g2 that is extended at two ends by 30 degrees as compared with the range G2. To train a back-side dictionary corresponding to a range G3 in the spin direction, the back-side dictionary is trained in a range g3 that is extended at two ends by 30 degrees as compared with the range G3. To train a right-side dictionary corresponding to a range G4 in the spin direction, the right-side dictionary is trained in a range g4 that is extended at two ends by 30 degrees as compared with the range G4. Here, in the explanation, the settings are made such that the selection range is 90 degrees and the learning range is extended by 30 degrees; however, this is not a limitation.

Furthermore, as illustrated in FIG. 11, the skeleton recognition may be executed by using 12 types of skeleton recognition dictionaries that are trained in the range that is ±30 degrees of the corresponding angle as a center at an interval of 30 degrees in the spin direction and the forward direction. For example, the learning range of the skeleton recognition dictionary used for 30 degrees of the person direction is a range H1. The learning range of the skeleton recognition dictionary used for 0 degrees of the person direction is a range H2. The learning range of the skeleton recognition dictionary used for 330 degrees of the person direction is a range H3. Moreover, although ±30 degrees is set in the example illustrated in FIG. 11, this is not a limitation.

Furthermore, to generate the scene recognition dictionary 130a and the skeleton recognition dictionary 130b, the learning unit 140a may sort the distance data (distance image), the site label image, the skeleton three-dimensional coordinates, or the like, based on the information on the joint position of the person and use the sorted information to generate the scene recognition dictionary 130a and the skeleton recognition dictionary 130b.

The scene recognizing unit 140b stores the recognition data from the distance sensor 20 in the recognition data buffer 130c. The scene recognizing unit 140b determines the scene identification information corresponding to the recognition data based on the feature of the recognition data and the scene recognition dictionary 130a. The scene recognizing unit 140b outputs the determined scene identification information to the skeleton recognizing unit 140c.

An explanation is given of an example of the process by the scene recognizing unit 140b to recognize a scene based on the threshold for a feature set in the scene recognition dictionary 130a. For the convenience of explanation, "a1" is the feature of distance data A corresponding to the scene identification information "the first scene", and "b1" is the feature of distance data B corresponding to the scene identification information "the second scene". Here, a1<b1. Furthermore, "c1" is the feature of the recognition data (distance data C). Here, when the feature c1 is smaller than (a1+b1)/2, the scene recognizing unit 140b determines that the scene identification information corresponding to the recognition data is "the first scene". Conversely, when the feature c1 is larger than (a1+b1)/2, the scene recognizing unit 140b determines that the scene identification information corresponding to the recognition data is "the second scene".

Furthermore, in a case where the scene recognition dictionary 130a classifies each scene by using a threshold for values of a plurality of features, the scene recognizing unit 140b obtains the value of each feature (e.g., the above-described features 77, 5, . . . , 123) with regard to the recognition data and recognizes the scene depending on whether the value of each feature exceeds the threshold. For example, the scene recognizing unit 140b recognizes the recognition data as the first scene when the value of the feature 77 regarding the recognition data is more than a, the value of the feature 5 is more than b, . . . , and the value of the feature 123 is more than c.

The skeleton recognizing unit 140c is a processing unit that recognizes the skeleton position of the object person 6a based on the information on the skeleton recognition dictionary 130b corresponding to the scene identification information recognized by the scene recognizing unit 140b.

The recognition apparatus 100 may further include a performance determining unit that determines the performance of the object person 6a based on information generated by the skeleton recognizing unit 140c.

Figure 12:
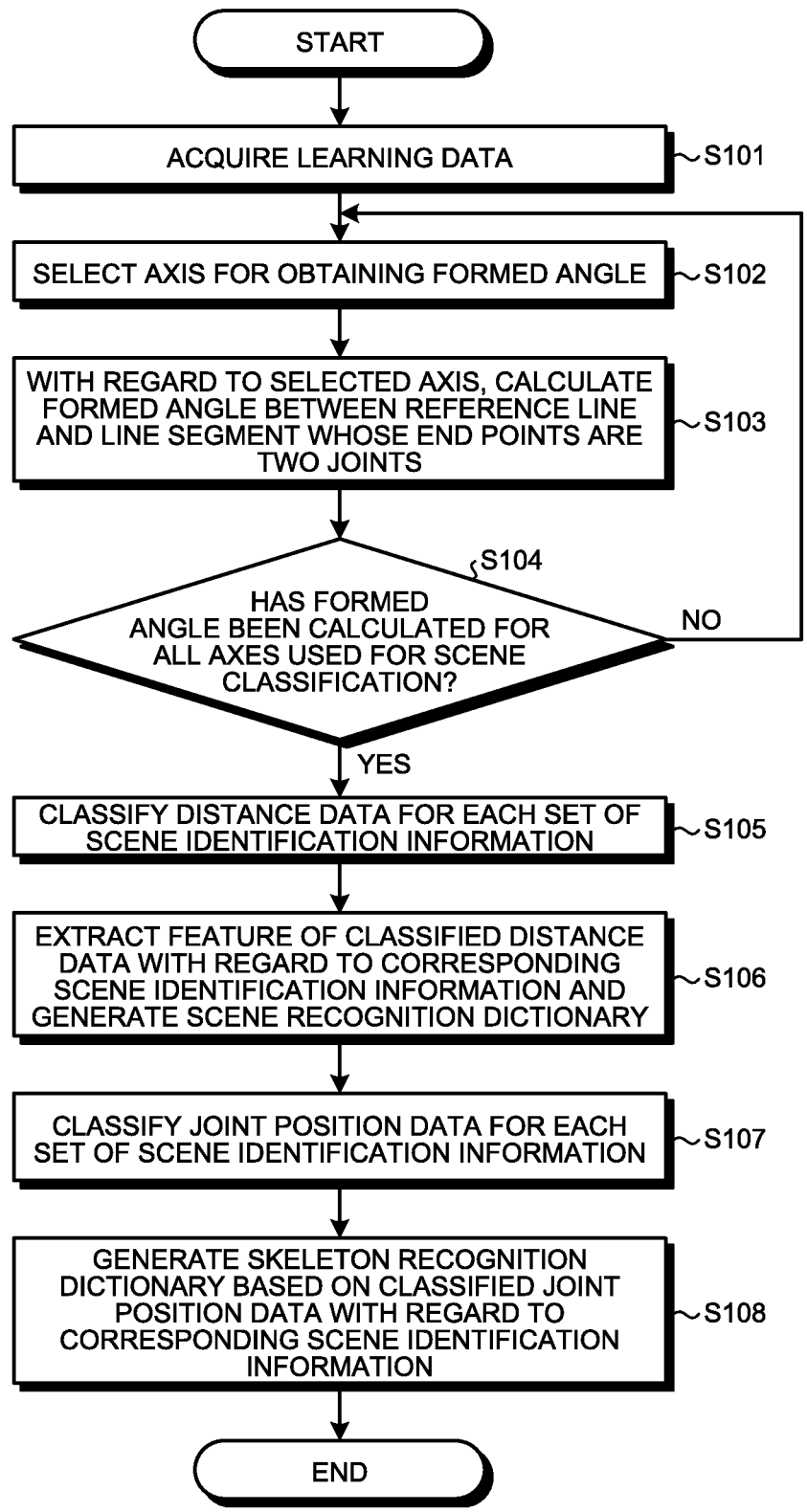
FIG. 12 is a flowchart that illustrates the steps of a process of a learning unit according to the first embodiment.

Next, an example of the steps of the process of the learning unit 140a according to the first embodiment is described. FIG. 12 is a flowchart that illustrates the steps of the process of the learning unit according to the first embodiment. As illustrated in FIG. 12, the learning unit 140a acquires learning data (Step S101). Here, the learning data is data for generating the scene recognition dictionary 130a and the skeleton recognition dictionary 130b, and it includes, for example, joint position data, distance data (distance image), site label image, or information on skeleton three-dimensional coordinates.

The learning unit 140a selects the axis for obtaining the formed angle (Step S102). With regard to the selected axis, the learning unit 140a calculates the formed angle between the reference line and the line segment whose end points are two joints (Step S103).

In a case where the formed angle has been calculated for all the axes used for scene classification (Step S104, Yes), the learning unit 140a proceeds to Step S105. Conversely, in a case where the formed angle has not been calculated for all the axes used for scene classification (Step S104, No), the learning unit 140a proceeds to Step S102.

The learning unit 140a classifies the distance data for each set of scene identification information (Step S105). The learning unit 140a extracts the feature of the classified distance data with regard to the corresponding scene identification information and generates the scene recognition dictionary 130a (Step S106).

The learning unit 140a classifies the joint position data (distance data (distance image), site label image, or information on skeleton three-dimensional coordinates) for each set of scene identification information (Step S107). The learning unit 140a generates the skeleton recognition dictionary 130b based on the classified joint position data with regard to the corresponding scene identification information (Step S108).

Figure 13:
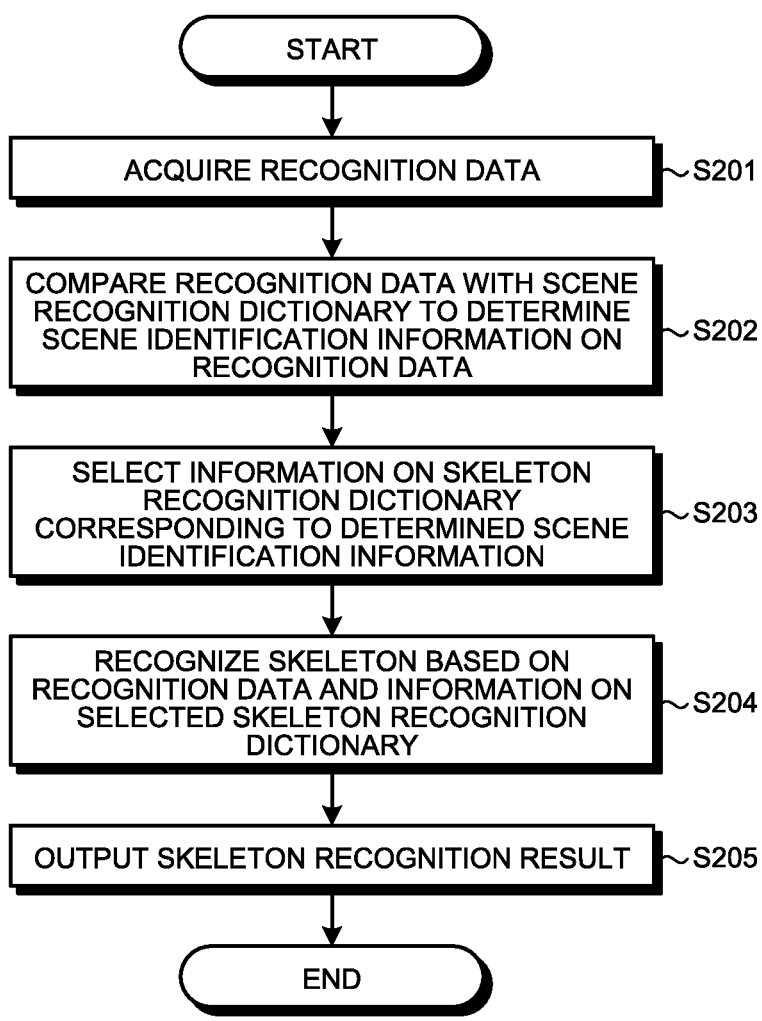
FIG. 13 is a flowchart that illustrates the steps of a recognition process by the recognition apparatus according to the first embodiment.

FIG. 13 is a flowchart that illustrates the steps of the recognition process by the recognition apparatus according to the first embodiment. As illustrated in FIG. 13, the scene recognizing unit 140b of the recognition apparatus 100 acquires recognition data from the distance sensor 20 (Step S201).

The scene recognizing unit 140b of the recognition apparatus 100 compares the recognition data with the scene recognition dictionary 130a to determine the scene identification information on the recognition data (Step S202). The skeleton recognizing unit 140c of the recognition apparatus 100 selects information on the skeleton recognition dictionary 130b corresponding to the determined scene identification information (Step S203).

The skeleton recognizing unit 140c recognizes the skeleton based on the recognition data and the information on the selected skeleton recognition dictionary 130b (Step S204). The skeleton recognizing unit 140c outputs a skeleton recognition result (Step S205).

Next, the advantageous effect of the recognition apparatus 100 according to the first embodiment is described. The recognition apparatus 100 stores, in the storage unit 130, the scene recognition dictionary 130a in which the scene identification information identified by the angle between a plurality of reference axes and the axis based on the skeleton of the person is related to the feature of the distance data and the skeleton recognition dictionary 130b in which the scene identification information, the distance data, and the joint position of the person are related. Furthermore, after acquiring the recognition data, the recognition apparatus 100 identifies the scene identification information based on the scene recognition dictionary 130a and uses the information in the skeleton recognition dictionary 130b corresponding to the identified scene identification information to recognize the skeleton of the object. Thus, as the skeleton recognition is enabled by the skeleton recognition dictionary 130b that is formed of the limited attitude, the accuracy of the skeleton recognition is improved.

Furthermore, the recognition apparatus 100 sets a larger range of the direction of a person included in the skeleton recognition dictionary selected in accordance with a scene as compared with the range of the direction of the person in a specific area for scene recognition, whereby the proper attitude may be recognized even if an error occurs in the angle detection for the direction of the person during the scene recognition.

Furthermore, the learning unit 140a according to the above-described first embodiment repeatedly performs the process to extract a feature from a plurality of sets of distance data that are classified into the identical scene identification information by using, for example, Random Forest so as to generate the scene recognition dictionary 130a. However, the process by the learning unit 140a to extract a feature is not limited thereto.

For example, the learning unit 140a may use a technique for automatically extracting the feature of distance data by using deep learning. The learning unit 140a repeatedly inputs the scene identification information, which is correct, and the distance image data into a multi-layer neural network and causes it to learn so as to automatically determine "weight" for leading the distance data to the scene identification information that is correct. The learning unit 140a sets "weight" automatically determined by deep learning as the "feature" corresponding to the scene identification information. By automatically extracting a feature by using deep learning, the accuracy of the scene recognition may be improved.

Second Embodiment

FIG. 14 is a diagram that illustrates a configuration of a system according to a second embodiment. As illustrated in FIG. 14, the system includes distance sensors 70a, 70b, 70c and a recognition apparatus 200. The recognition apparatus 200 is coupled to the distance sensors 70a to 70c. Furthermore, the distance sensors 70a to 70c are disposed so as to surround the object person 6a. Furthermore, according to the second embodiment, an explanation is given of a case where, for example, the recognition apparatus 200 trains the scene recognition dictionary and the skeleton recognition dictionary; however, it is possible that an external computer other than the recognition apparatus 200 trains the scene recognition dictionary and the skeleton recognition dictionary and the recognition apparatus 200 stores therein the scene recognition dictionary and the skeleton recognition dictionary.

In the example described according to the first embodiment, as the single distance sensor 20 is used, the distance from the distance sensor 20 to each observation point on the person at the side of the sensor may be measured. Conversely, according to the second embodiment, the use of the distance sensors 70a to 70c makes it possible to measure the distance to each observation point on the person in all the directions.

Figure 15:
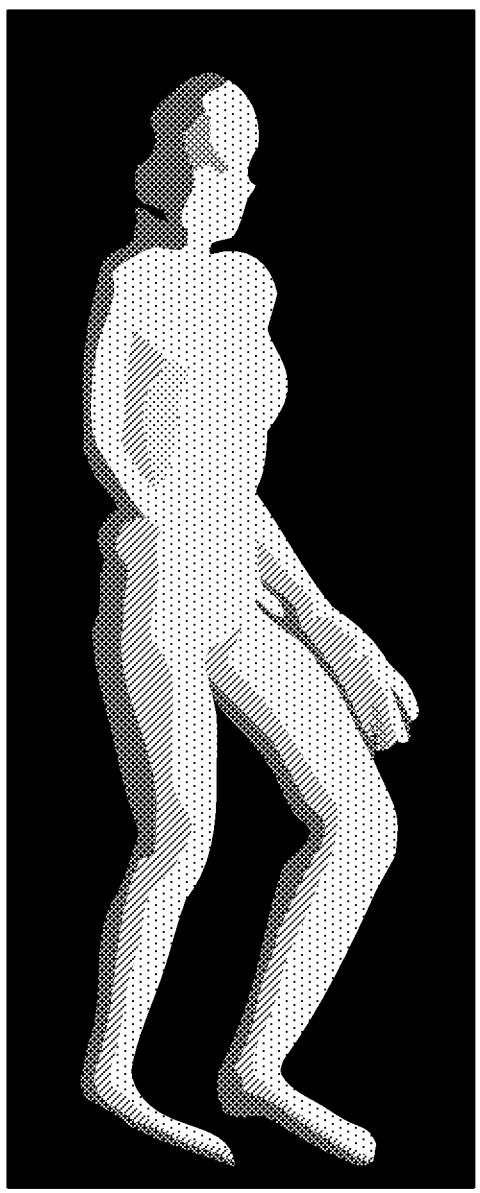
FIG. 15 is a diagram that illustrates an example of three-dimensional point group data.

The distance sensors 70a to 70c are sensors that measure the distance information from the installation position of the distance sensor to each observation point on the object person 6a included in the capturing range of the distance sensor. In the following description, the distance sensors 70a to 70c are collectively described as a distance sensor 70. The distance sensor 70 operates on the learning phase and the recognition phase. The distance sensor 70 generates the distance data (three-dimensional point group data) indicating the three-dimensional coordinates of each observation point and outputs the generated distance data to the recognition apparatus 200. FIG. 15 is a diagram that illustrates an example of the three-dimensional point group data. The three-dimensional point group data is the information that is the group of distances from the respective distance sensors 70a to 70c to each observation point on the person.

Figure 16:
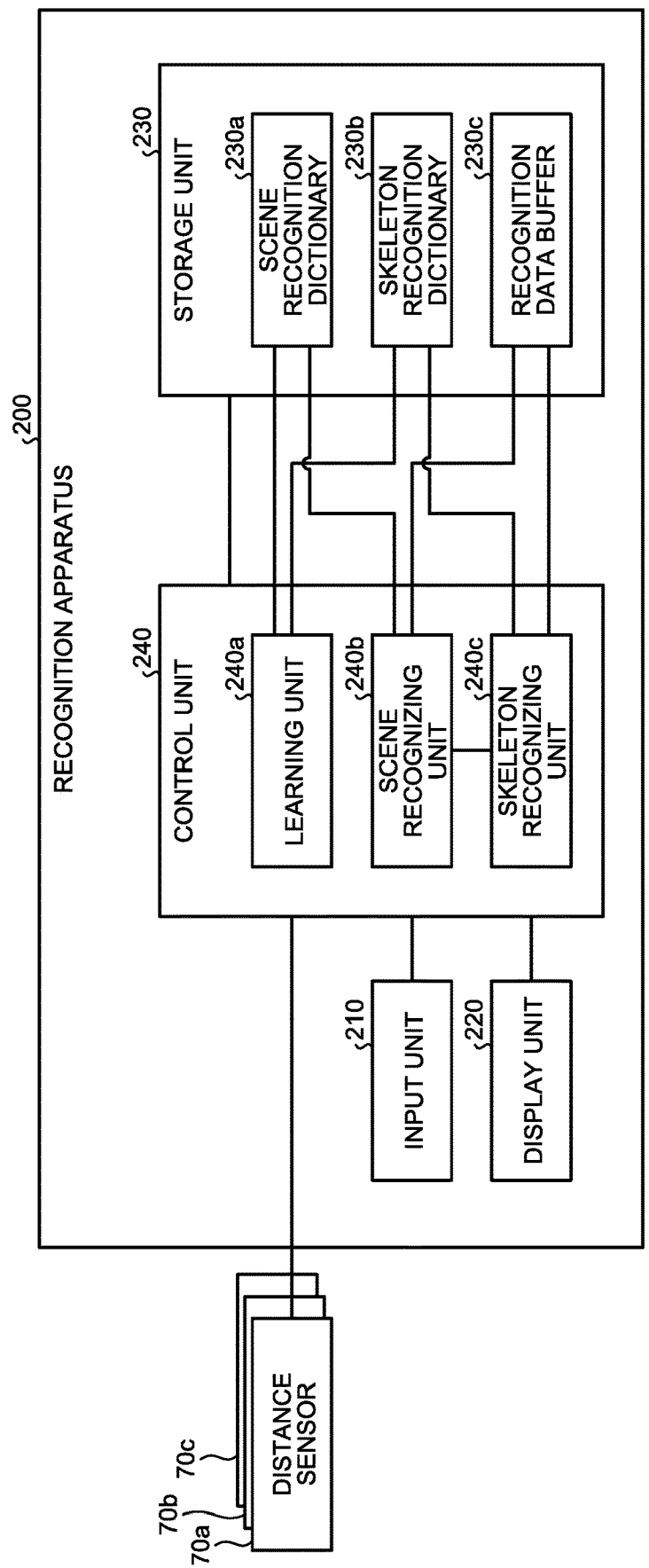
FIG. 16 is a functional block diagram that illustrates a configuration of a recognition apparatus according to the second embodiment.

FIG. 16 is a functional block diagram that illustrates a configuration of a recognition apparatus according to the second embodiment. As illustrated in FIG. 16, the recognition apparatus 200 includes an input unit 210, a display unit 220, a storage unit 230, and a control unit 240. Furthermore, the recognition apparatus 200 is coupled to the distance sensors 70a to 70c. The descriptions of the input unit 210 and the display unit 220 are the same as those of the input unit 110 and the display unit 120 illustrated in FIG. 2.

The storage unit 230 includes a scene recognition dictionary 230a, a skeleton recognition dictionary 230b, and a recognition data buffer 230c. The storage unit 230 corresponds to a semiconductor memory device such as a RAM, a ROM, or a flash memory, or a storage device such as an HDD.

The scene recognition dictionary 230a is the dictionary information used for determining which scene the recognition data corresponds to. For example, the scene recognition dictionary 230a relates the scene identification information for uniquely identifying a scene and the feature of the distance data corresponding to the scene identification information. The feature is a feature of the three-dimensional point group data corresponding to the scene. For example, the feature of three-dimensional point group data is identified based on machine learning.

The skeleton recognition dictionary 230b is dictionary information indicating the hypothetical joint position (skeleton position) in a single scene. For example, the skeleton recognition dictionary 230b relates predetermined scene identification information, the distance data corresponding to the predetermined scene identification information, and the information on the joint position of a person.

The recognition data buffer 230c is a buffer that stores recognition data. The recognition data is three-dimensional point group data that is the group of the distance data output from each of the distance sensors 70.

The control unit 240 includes a learning unit 240a, a scene recognizing unit 240b, and a skeleton recognizing unit 240c. The control unit 240 is implemented by using a CPU, an MPU, or the like. Furthermore, the control unit 240 may be implemented by using a hard wired logic such as an ASIC or an FPGA.

The learning unit 240a is a processing unit that generates the scene recognition dictionary 230a and the skeleton recognition dictionary 230b. First, an explanation is given of an example of the process by the learning unit 240a to generate the scene recognition dictionary 230a. The learning unit 240a extracts the feature for each set of scene identification information from the distance data to generate the scene recognition dictionary 230a.

For example, the learning unit 240a extracts the feature of each set of three-dimensional point group data in the distance data classified as the first scene on the basis of the joint position data on the person. With regard to a feature extracted from each set of three-dimensional point group data, the learning unit 240a finds, through machine learning, the pair of the feature and the threshold with which each scene may be properly classified, and registers it in the scene recognition dictionary 230a.

An explanation is given of an example of the process by the learning unit 240a to generate the skeleton recognition dictionary 230b. The learning unit 240a is a processing unit that acquires the joint position data (distance image, site label image, or skeleton three-dimensional coordinates) corresponding to predetermined scene identification information, relates the predetermined scene identification information with the joint position data, and registers them in the skeleton recognition dictionary 230b. According to the second embodiment, for example, the predetermined scene identification information is "the first scene".

The scene recognizing unit 240b stores the recognition data acquired from the distance sensor 70 in the recognition data buffer 230c. The scene recognizing unit 240b is a processing unit that acquires the recognition data stored in the recognition data buffer 230c and compares the feature of the acquired recognition data with the scene recognition dictionary 230a so as to identify the scene identification information on the acquired recognition data. The scene recognizing unit 240b outputs the scene identification information as a determination result and the recognition data to the skeleton recognizing unit 240c.

The skeleton recognizing unit 240c is a processing unit that recognizes the skeleton position of the object person 6a based on the recognition data. The skeleton recognizing unit 240c compares the recognition data with the skeleton recognition dictionary 230b in a case where the scene identification information, which is a determination result of the scene recognizing unit 240b, is "the first scene", thereby identifying the joint position of the object person 6a.

When the scene identification information, which is a determination result of the scene recognizing unit 240b, is "other than the first scene", the skeleton recognizing unit 240c rotates the direction of the three-dimensional point group data on the recognition data such that it is set in the direction corresponding to the first scene. For example, with regard to each of the second to the eighth scenes, information as to which direction the three-dimensional point group data is to be rotated and how much degrees it is to be rotated is previously defined so that the skeleton recognizing unit 240c rotates the direction of the three-dimensional point group data based on the information. The skeleton recognizing unit 240c compares the rotated recognition data with the skeleton recognition dictionary 230b to identify the joint position of the object person 6a.

Figure 17:
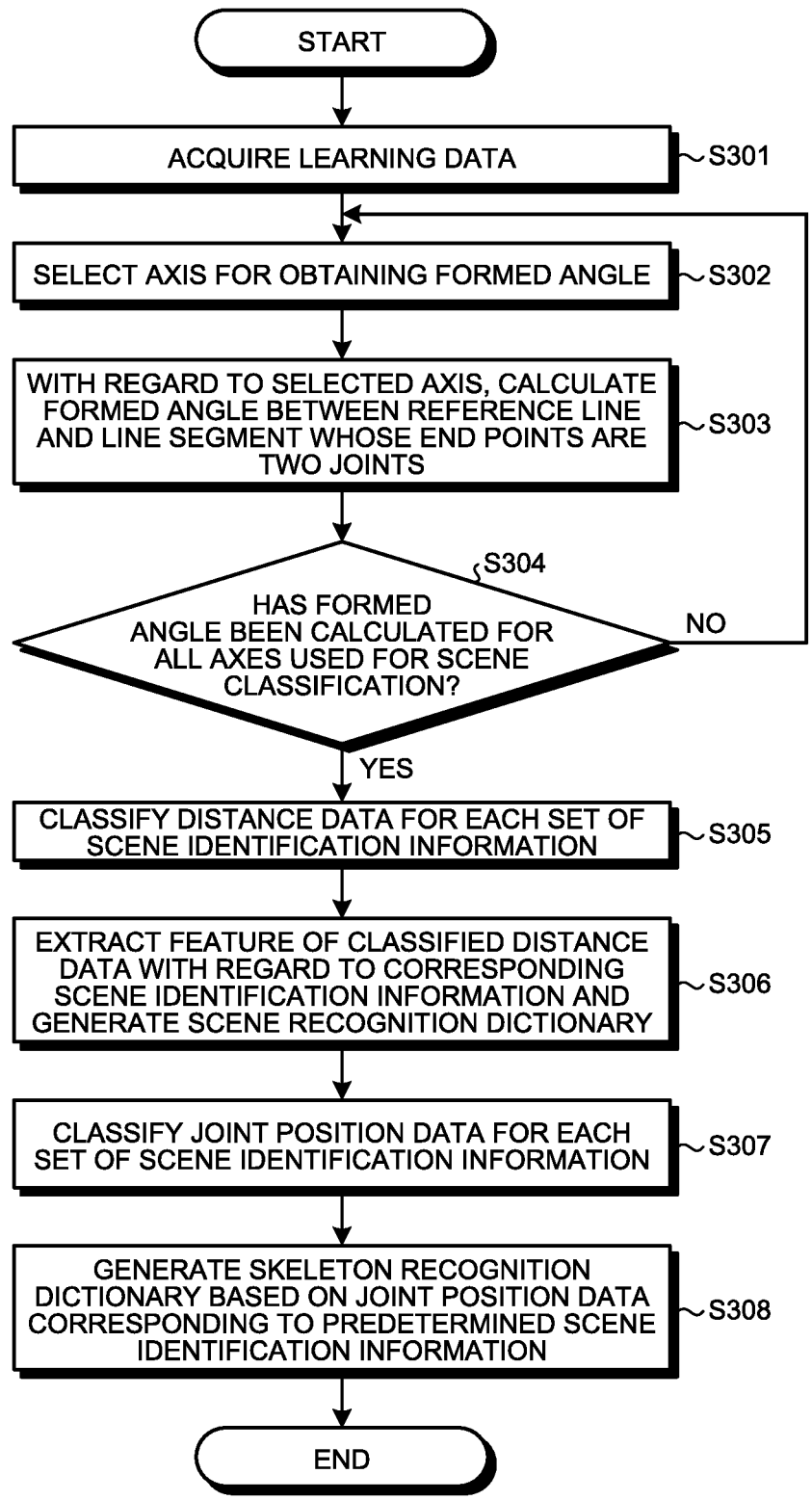
FIG. 17 is a flowchart that illustrates the steps of a process of a learning unit according to the second embodiment.

Next, an example of the steps of a process of the recognition apparatus 200 according to the second embodiment is described. FIG. 17 is a flowchart that illustrates the steps of a process of the learning unit according to the second embodiment. As illustrated in FIG. 17, the learning unit 240a acquires learning data (Step S301). Here, the learning data is data for generating the scene recognition dictionary 230a and the skeleton recognition dictionary 230b, and it includes, for example, joint position data, distance data (distance image), site label image, or information on the skeleton three-dimensional coordinates. The learning unit 240a selects the axis for obtaining the formed angle (Step S302). With regard to the selected axis, the learning unit 240a calculates the formed angle between the reference line and the line segment whose end points are two joints (Step S303).

In a case where the formed angle has been calculated for all the axes used for the scene classification (Step S304, Yes), the learning unit 240a proceeds to Step S305. Conversely, in a case where the formed angle has not been calculated for all the axes used for the scene classification (Step S304, No), the learning unit 240a proceeds to Step S302.

The learning unit 240a classifies the distance data for each set of scene identification information (Step S305). The learning unit 240a extracts the feature of the classified distance data with regard to the corresponding scene identification information and generates the scene recognition dictionary 230a (Step S306).

The learning unit 240a classifies the joint position data (distance data (distance image), site label image, or information on the skeleton three-dimensional coordinates) for each set of scene identification information (Step S307). The learning unit 240a generates the skeleton recognition dictionary 230b based on the joint position data corresponding to the predetermined scene identification information (Step S308).

Figure 18:
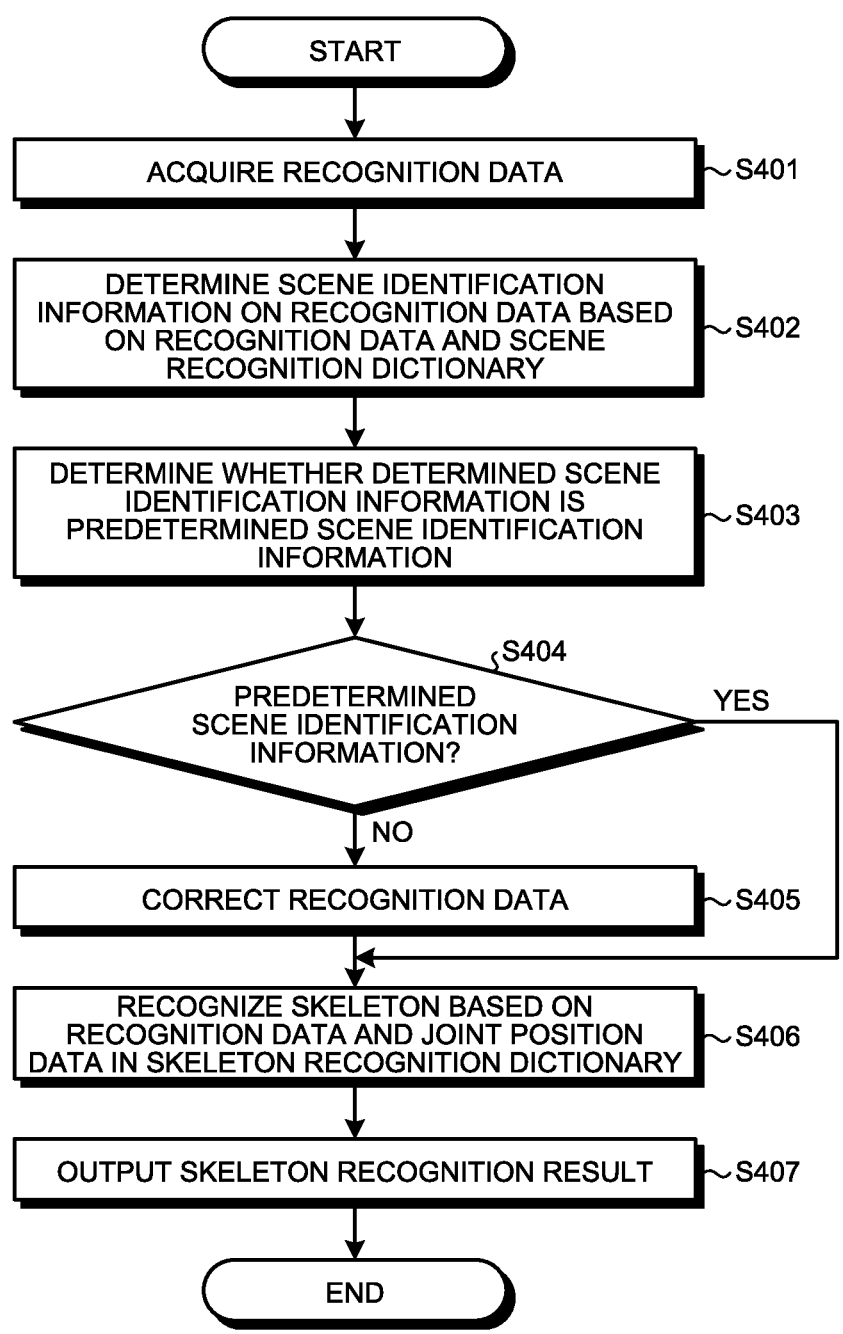
FIG. 18 is a flowchart that illustrates the steps of a recognition process of the recognition apparatus according to the second embodiment.

FIG. 18 is a flowchart that illustrates the steps of the recognition process of the recognition apparatus according to the second embodiment. As illustrated in FIG. 18, the scene recognizing unit 240b of the recognition apparatus 200 acquires recognition data from the distance sensor 70 (Step S401).

The scene recognizing unit 240b compares the recognition data with the scene recognition dictionary 230a to determine the scene identification information on the recognition data (Step S402). The skeleton recognizing unit 240c of the recognition apparatus 200 determines whether the determined scene identification information is the predetermined scene identification information (Step S403). In the description according to the second embodiment, for example, the predetermined scene identification information is "the first scene". As described above, the first scene is a scene where the attitude of the object person 6a in the forward direction is "upright" and the attitude in the spin direction is "the front side".

In a case where the determined scene identification information is the predetermined scene identification information (Step S404, Yes), the skeleton recognizing unit 240c of the recognition apparatus 200 proceeds to Step S406. Conversely, in a case where the determined scene identification information is not the predetermined scene identification information (Step S404, No), the skeleton recognizing unit 240c proceeds to Step S405.

The skeleton recognizing unit 240c corrects (rotates) the direction of the three-dimensional point group data in the recognition data to obtain the predetermined scene identification information (the first scene) (Step S405). The skeleton recognizing unit 240c recognizes the skeleton based on the recognition data and the joint position data in the skeleton recognition dictionary 230b (Step S406). The skeleton recognizing unit 240c outputs a skeleton recognition result (Step S407).

Next, the advantageous effect of the recognition apparatus 200 according to the second embodiment is described. The recognition apparatus 200 prepares the skeleton recognition dictionary 230b for a view in one direction, such as the front side of a body. During the recognition, after executing the scene classification, the recognition apparatus 200 aligns the direction of the three-dimensional point group data with the direction assumed by the skeleton recognition dictionary 230b and then executes the skeleton recognition. As a result, one scene may be prepared in the skeleton recognition dictionary 230b, and the learning time may be shortened.

Furthermore, according to the first and the second embodiments, for example, the scene identification information is determined by using the distance sensors 20, 70; however, this is not a limitation. For example, it is possible that the recognition apparatuses 100, 200 are coupled to an RGB camera and, based on image data captured by the RGB camera, the scene identification information on the object person 6a is determined.

Figure 19:
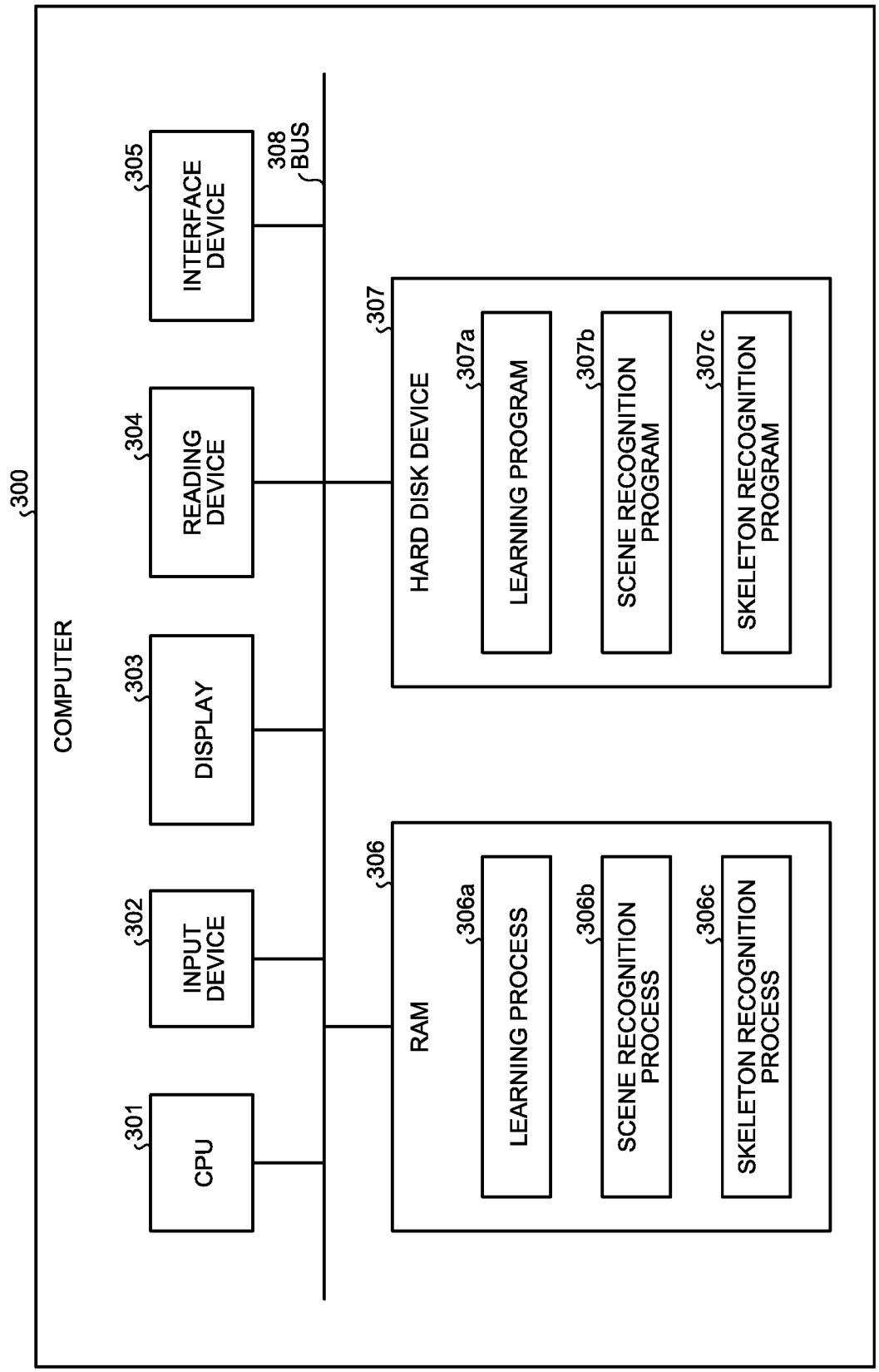
FIG. 19 is a diagram that illustrates an example of the hardware configuration of a computer that performs the same function as those of the recognition apparatuses.
Figure 20:
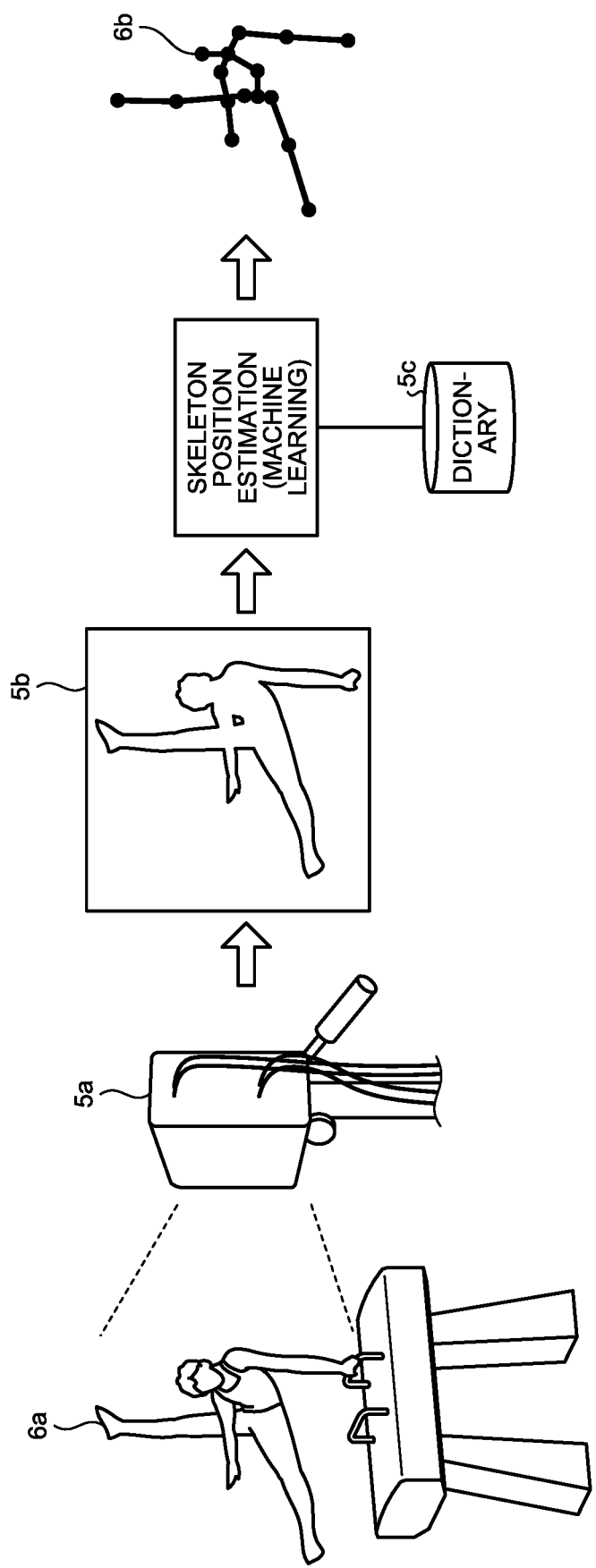
FIG. 20 is a diagram that illustrates an example of a related skeleton recognition system.
Figure 21:
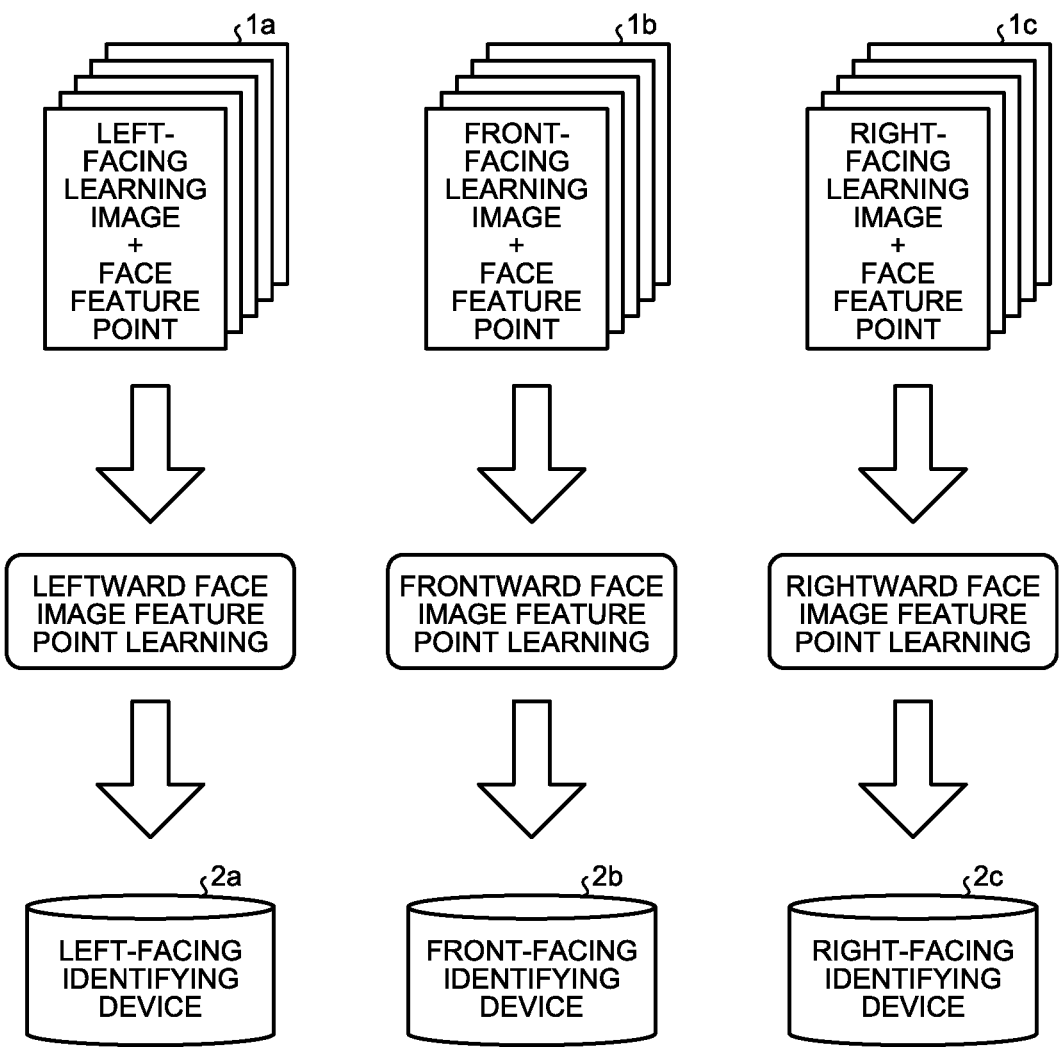
FIG. 21 is a diagram that illustrates an example of learning of a face feature point according to a related art 2.
Figure 22:
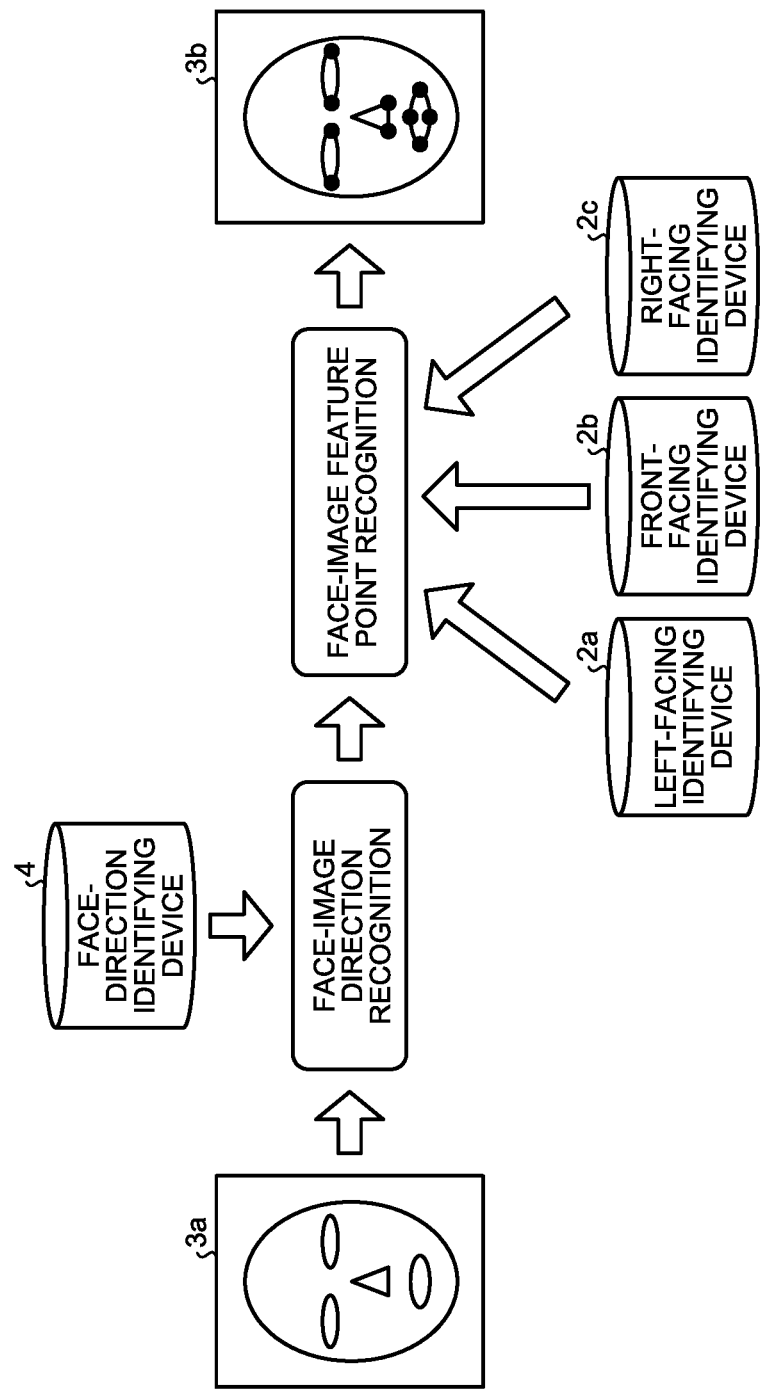
FIG. 22 is a diagram that illustrates a recognition process of a feature point according to the related art 2.

Next, an example of the hardware configuration of a computer that performs the same function as those of the recognition apparatuses 100, 200 described in the above-described embodiments is described. FIG. 19 is a diagram that illustrates an example of the hardware configuration of a computer that performs the same function as those of the recognition apparatuses.

As illustrated in FIG. 19, a computer 300 includes a CPU 301 that executes various types of arithmetic processing; an input device 302 that receives the input of data from the user; and a display 303. Furthermore, the computer 300 includes a reading device 304 that reads a program, and the like, from a storage medium; and an interface device 305 that executes data transaction with a different computer via a wired or wireless network. For example, the interface device 305 is coupled to the distance sensors 20, 70a to 70c, and the like. Furthermore, the computer 300 includes a RAM 306 that temporarily stores various types of information; and a hard disk device 307. Moreover, each of the devices 301 to 307 is coupled to a bus 308.

The hard disk device 307 includes a learning program 307a, a scene recognition program 307b, and a skeleton recognition program 307c. The CPU 301 reads the learning program 307a, the scene recognition program 307b, and the skeleton recognition program 307c and loads them into the RAM 306.

The learning program 307a functions as a learning process 306a. The scene recognition program 307b functions as a scene recognition process 306b. The skeleton recognition program 307c functions as a skeleton recognition process 306c.

A process in the learning process 306a corresponds to a process of the learning units 140a, 240a. A process in the scene recognition process 306b corresponds to a process of the scene recognizing units 140b, 240b. A process in the skeleton recognition process 306c corresponds to a process of the skeleton recognizing units 140c, 240c.

Furthermore, each of the programs 307a to 307c does not need to be initially stored in the hard disk device 307. For example, each program is stored in a "portable physical medium" such as a flexible disk (FD), CD-ROM, DVD disk, magnetic optical disk, or IC card, inserted into the computer 300. Further, the computer 300 may read and execute each of the programs 307a to 307c.

It is possible to improve the accuracy of recognition of the skeleton of a human body.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A recognition apparatus comprising:
   a memory configured to store a scene recognition dictionary relating a feature of distance information indicating a distance from a sensor to a person with a scene identified by an angle between each of a plurality of reference axes perpendicular to each other and a vector formed based on a skeleton of the person, and a skeleton recognition dictionary relating distance information related to the scene with information on a joint position of the person, a range of the distance information related to each scene in the skeleton recognition dictionary is wider than a range of the distance information related to each scene in the scene recognition dictionary; and
   a processor coupled to the memory and configured to:
      in a case where recognition distance information, which is distance information on an object person, is acquired, recognize a scene related to the recognition distance information based on a feature of the recognition distance information and the scene recognition dictionary, and recognize a skeleton of the object person based on the scene recognized, the recognition distance information, and the skeleton recognition dictionary.

2. The recognition apparatus according to claim 1, wherein the processor is further configured to:

acquire a plurality of sets of distance information respectively related to information on the joint position of the person, classify the plurality of sets of distance information based on the information on the joint position for each scene, and generate the scene recognition dictionary and the skeleton recognition dictionary based on the plurality of sets of distance information classified and the information on the joint position.

3. The recognition apparatus according to claim 2, wherein the information on the joint position is measured during motion capture.

4. The recognition apparatus according to claim 2, wherein the processor is further configured to:

repeatedly input a pair of a predetermined scene and the distance information on the person related to the predetermined scene into a multi-layer neural network so as to determine a weight of the neural network for leading the distance information on the person to the predetermined scene, and extract the determined weight as a feature of the predetermined scene to generate the scene recognition dictionary.

5. The recognition apparatus according to claim 1, wherein the skeleton recognition dictionary includes information where distance information related to a single predetermined scene and the information on the joint position of the person are related, and the processor is further configured to:

in a case where the recognition distance information is acquired from a plurality of sensors, recognize a scene related to the recognition distance information based on a feature of the recognition distance information and the scene recognition dictionary;

rotate the recognition distance information related to the scene recognized, the scene is not the single predetermined scene to obtain recognition distance information related to the single predetermined scene and, based on the rotated recognition distance information and the skeleton recognition dictionary, recognize the skeleton of the object person indicating a skeleton position.

6. A recognition method executed by a processor, the recognition method comprising:

referring to a storage device that stores a scene recognition dictionary relating a feature of distance information indicating a distance from a sensor to a person with a scene identified by an angle between each of a plurality of reference axes perpendicular to each other and a vector formed based on a skeleton of the person, and a skeleton recognition dictionary relating distance information related to the scene with information on a joint position of the person, a range of the distance information related to each scene in the skeleton recognition dictionary is wider than a range of the distance information related to each scene in the scene recognition dictionary;

recognizing, in a case where recognition distance information, which is distance information on an object person, is acquired, a scene related to the recognition distance information based on a feature of the recognition distance information and the scene recognition dictionary, and recognizing a skeleton of the object person based on the recognized scene, the recognition distance information, and the skeleton recognition dictionary.

7. A non-transitory computer-readable recording medium storing therein a recognition program that causes a computer to execute a process, the process comprising:

referring to a storage device that stores a scene recognition dictionary relating a feature of distance information indicating a distance from a sensor to a person with a scene identified by an angle between each of a plurality of reference axes perpendicular to each other and a vector formed based on a skeleton of the person, and a skeleton recognition dictionary relating distance information related to the scene with information on a joint position of the person, a range of the distance information related to each scene in the skeleton recognition dictionary is wider than a range of the distance information related to each scene in the scene recognition dictionary;

recognizing, in a case where recognition distance information, which is distance information on an object person, is acquired, a scene related to the recognition distance information based on a feature of the recognition distance information and the scene recognition dictionary, and recognizing a skeleton of the object person based on the recognized scene, the recognition distance information, and the skeleton recognition dictionary.

* * * * *